(12) United States Patent
Chae

(10) Patent No.: US 12,388,800 B2
(45) Date of Patent: Aug. 12, 2025

(54) COMMUNICATION SYSTEM, COMMUNICATION METHOD, AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 18/018,264

(22) PCT Filed: Feb. 28, 2022

(86) PCT No.: PCT/JP2022/008319
§ 371 (c)(1),
(2) Date: Jan. 26, 2023

(87) PCT Pub. No.: WO2023/162232
PCT Pub. Date: Aug. 31, 2023

(65) Prior Publication Data
US 2024/0250935 A1    Jul. 25, 2024

(51) Int. Cl.
*H04L 9/40* (2022.01)
*H04L 9/30* (2006.01)
*H04L 9/32* (2006.01)

(52) U.S. Cl.
CPC ........... *H04L 63/0428* (2013.01); *H04L 9/30* (2013.01); *H04L 9/3271* (2013.01)

(58) Field of Classification Search
CPC ..... H04L 63/0428; H04L 9/30; H04L 9/3271; H04L 9/3297; H04L 9/16; H04L 9/14; H04L 63/1441; H04L 63/0861
See application file for complete search history.

(56) References Cited

U.S. PATENT DOCUMENTS 6,128,735 A * 10/2000 Goldstein ............... H04L 9/088
713/166
10,778,450 B1 * 9/2020 Griffin .................. H04L 9/0844
(Continued)

FOREIGN PATENT DOCUMENTS

JP    H01-212041 A    8/1989
JP    2689383 B2    12/1997
(Continued)

OTHER PUBLICATIONS

International Search Report of May 24, 2022, for International Patent Application PCT/JP2022/008319 pp. 1-11.
(Continued)

*Primary Examiner* — J. Brant Murphy
(74) *Attorney, Agent, or Firm* — HEA LAW PLLC

(57) ABSTRACT

A communication system, comprising: a first device; and a second device, wherein the first device is configured to: generate first transformed data by subjecting original data to first transformation corresponding to a first period to which a first time point at which the original data is transformed belongs; and transmit the first transformed data to the second device, and wherein the second device is configured to: receive the first transformed data from the first device; and acquire the original data by subjecting the first transformed data to first inverse transformation corresponding to the first period.

14 Claims, 11 Drawing Sheets

(56) References Cited

U.S. PATENT DOCUMENTS

| | | | |
|---|---|---|---|
| 2006/0291662 A1* | 12/2006 | Takahashi | H04L 63/061 380/278 |
| 2008/0263363 A1* | 10/2008 | Jueneman | H04L 9/0877 713/184 |
| 2009/0007257 A1* | 1/2009 | Hirata | G06F 21/32 726/19 |
| 2011/0167264 A1 | 7/2011 | Takahashi et al. | |
| 2013/0013931 A1* | 1/2013 | O'Hare | H04L 9/3231 713/189 |
| 2019/0052632 A1* | 2/2019 | Takagi | H04L 9/3271 |
| 2021/0328800 A1* | 10/2021 | Lee | H04W 12/033 |
| 2021/0374219 A1* | 12/2021 | Suwa | G06F 21/32 |
| 2022/0069995 A1* | 3/2022 | Philipp | H04L 9/12 |

FOREIGN PATENT DOCUMENTS

| | | | |
|---|---|---|---|
| JP | 2000244474 A | 9/2000 | |
| JP | 2001524771 A | 12/2001 | |
| JP | 2006340296 A | 12/2006 | |
| JP | 2007156785 A | 6/2007 | |
| JP | 4966765 B2 | 7/2012 | |
| JP | 6866803 B2 | 4/2021 | |
| JP | WO2020085141 A1 | 9/2021 | |

OTHER PUBLICATIONS

Search Report of Aug. 8, 2023, for corresponding EP Patent Application No. 22843991.5, pp. 1-8.

* cited by examiner

| DAY | TIME SLOT | SALT |
|---|---|---|
| 01 | 00 | 7438 |
|  | 01 | 4214 |
|  | 02 | 2256 |
|  | 03 | 3101 |
|  | ⋮ | ⋮ |
|  | 23 | 8201 |
| 02 | 00 | 6435 |
|  | 01 | 8414 |
|  | 02 | 9436 |
|  | 03 | 2981 |
|  | ⋮ | ⋮ |
|  | 23 | 1983 |
| ⋮ | ⋮ | ⋮ |
| 31 | 00 | 3908 |
|  | 01 | 3871 |
|  | 02 | 7392 |
|  | 03 | 9823 |
|  | ⋮ | ⋮ |
|  | 23 | 2121 |

| USER ID | PASSWORD | FULL NAME | TUID | PHOTOGRAPH OF FACE | FEATURE AMOUNT OF FACE |
|---|---|---|---|---|---|
| taro.yamada123 | ********** | TARO YAMADA | 312456 | 00001.jpg | (a1,b2,c3,····) |
| hanako.suzuki999 | ****** | HANAKO SUZUKI | 409193 | 00002.jpg | (a2,b2,c2,····) |
| jiro.kimura1010 | ******** | JIRO KIMURA | 225091 | 00003.jpg | (a3,b3,c3,····) |
| ·· | ·· | ·· | ·· | ·· | ·· |

COMMUNICATION SYSTEM, COMMUNICATION METHOD, AND PROGRAM

CROSS REFERENCE TO RELATED APPLICATIONS

This application is a National Stage of International Application No. PCT/JP2022/008319 filed on Feb. 28, 2022. The contents of the above document is incorporated herein by reference in its entirety.

TECHNICAL FIELD

The present disclosure relates to a communication system, a communication method, and a program.

BACKGROUND ART

Hitherto, in the field of communication, there has been known a technology for transforming original data so as to prevent content of the original data from being known to a third party. For example, in Patent Literature 1, there is described a technology for generating a user parameter based on a user ID input by a user and transforming biometric data, which is an example of the original data, based on the generated user parameter. For example, in Patent Literature 2, there is described a technology for transforming a salt, which is an example of the original data, through use of a public key cryptosystem. For example, in Patent Literature 3, there is described a technology called "challenge-and-response," which is a kind of public key cryptosystem.

CITATION LIST

Patent Literature

[PTL 1] JP 4966765 B2
[PTL 2] JP 6866803 B2
[PTL 3] JP WO 2020/85141 A1

SUMMARY OF INVENTION

Technical Problem

However, in the technology of Patent Literature 1, a user parameter is transmitted over a network, and hence a malicious third party can easily acquire the user parameter. When the third party obtains biometric data on a user in some way, impersonation using the fraudulently obtained user parameter and biometric data becomes possible. A user parameter is generated based on a user ID that does not change in principle once issued, and hence it becomes possible for the third party to impersonate the user over a long period of time through use of the user parameter obtained once.

The public key cryptosystems of Patent Literatures 2 and 3 are each a cryptosystem using a pair of a public key, which is disclosed to third parties, and a secret key, which is not disclosed to third parties. However, a secret key is information that does not change in principle, and hence when a third party obtains the secret key in some way, it becomes possible for the third party to keep committing a fraud over a long period of time through use of the secret key obtained once. The technologies of Patent Literatures 1 to 3 each adversely allow a fraud over a long period of time, and hence security in communication cannot be sufficiently enhanced.

One of objects of the present disclosure is to enhance security in communication.

Solution to Problem

According to one aspect of the present disclosure, there is provided a communication system including: a first device; and a second device, wherein the first device includes: a transformation module configured to generate first transformed data by subjecting original data to first transformation corresponding to a first period to which a first time point at which the original data is transformed belongs; and a transmission module configured to transmit the first transformed data to the second device, and wherein the second device includes: a reception module configured to receive the first transformed data from the first device; and an inverse transformation module configured to acquire the original data by subjecting the first transformed data to first inverse transformation corresponding to the first period.

Advantageous Effects of Invention

According to the present disclosure, the security in the communication is enhanced.

BRIEF DESCRIPTION OF DRAWINGS

FIG. 4 is a table for showing an example of a salt database.
FIG. 5 is a table for showing an example of a user database.

DESCRIPTION OF EMBODIMENTS

1. First Embodiment

A communication system according to a first embodiment of the present disclosure, which is an exemplary embodiment of the present disclosure, is described. In the first embodiment, a case in which the communication system is applied to a situation in which user authentication is performed is taken as an example, but the communication system can be applied to any situation. Examples of application to another situation is described in Modification Example 4 described later.

1-1. Overall Configuration of Communication System

Figure 1:
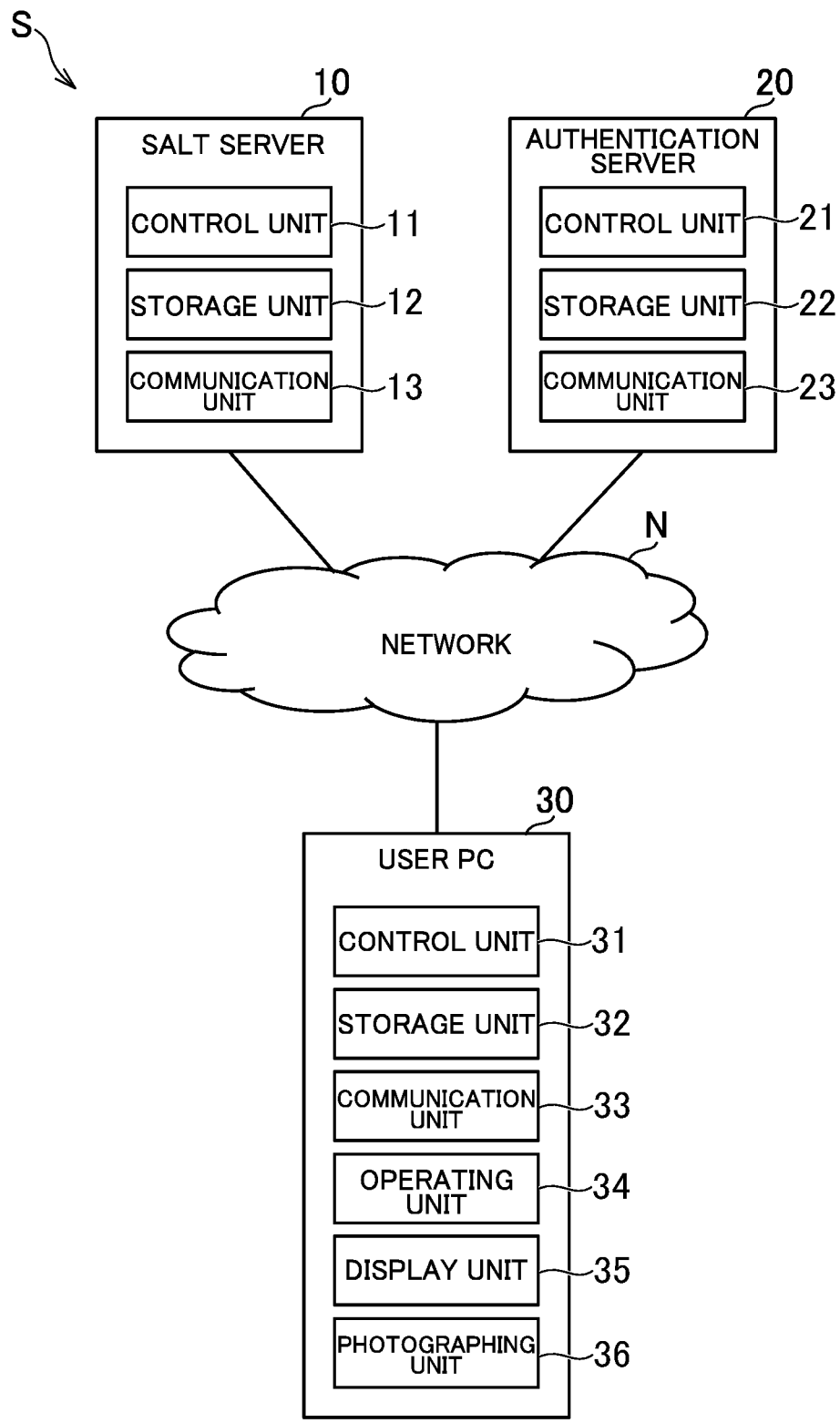
FIG. 1 is a diagram for illustrating an example of an overall configuration of a communication system.

FIG. 1 is a diagram for illustrating an example of an overall configuration of the communication system. As illustrated in FIG. 1, a communication system S includes a salt server 10, an authentication server 20, and a user PC 30. The salt server 10, the authentication server 20, and the user PC 30 can be connected to a network N such as the Internet or a LAN. The communication system S is only required to include at least one computer, and is not limited to the example of FIG. 1.

The salt server 10 is a server computer. A control unit 11 includes at least one processor. A storage unit 12 includes a volatile memory such as a RAM, and a nonvolatile memory such as a hard disk drive. A communication unit 13 includes at least one of a communication interface for wired communication or a communication interface for wireless communication.

The salt server 10 is an example of a third device. Accordingly, the salt server 10 as used herein can be read as "third device." The third device may be any device, and is not limited to the salt server 10 or another server computer. For example, the third device may be a personal computer, a tablet terminal, or a smartphone.

The salt server 10 manages salts in cryptography. A salt is information for transforming information to be transformed. The salt is the information to be input to a transform function together with the information to be transformed. The transformation may also be called "encryption" or "hashing." The transformation is reversible. Transformed information can be restored to information that has not been transformed by inverse transformation. Managing salts refers to storing salts.

As for the salt itself, a publicly known salt can be used. For example, the salt is a random value. The salt can have any format, such as numbers, characters, other symbols, or a combination thereof. The salt server 10 may generate a salt, or the salt generation itself may be performed by a device other than the salt server 10.

The authentication server 20 is a server computer. Physical configurations of a control unit 21, a storage unit 22, and a communication unit 23 may be the same as those of the control unit 11, the storage unit 12, and the communication unit 13, respectively.

The authentication server 20 is an example of a second device. Accordingly, the authentication server 20 as used herein can be read as "second device." The second device may be any device, and is not limited to the authentication server 20 or another server computer. For example, the second device may be a personal computer, a tablet terminal, or a smartphone.

The user PC 30 is a personal computer of a user. Physical configurations of a control unit 31, a storage unit 32, and a communication unit 33 may be the same as those of the control unit 11, the storage unit 12, and the communication unit 13, respectively. An operating unit 34 is an input device such as a mouse, a keyboard, or a touch panel. A display unit 35 is a liquid crystal display or an organic EL display. A photographing unit 36 includes at least one camera.

The user PC 30 is an example of a first device. Accordingly, the user PC 30 as used herein can be read as "first device." The first device may be any device, and is not limited to the user PC 30 or another personal computer. For example, the first device may be a tablet terminal, a smartphone, or a wearable terminal. In addition, for example, the first device may be a game machine, a vending machine, a POS terminal, an ATM, or another device.

Programs stored in the storage units 12, 22, and 32 may be supplied via the network N. For example, the programs stored in an information storage medium may be supplied through intermediation of at least one of a reading unit (for example, an optical disc drive or a memory card slot) for reading a computer-readable information storage medium, or an input/output unit (for example, a USB port) for inputting and outputting data to/from an external device.

1-2. Outline of Communication System According to First Embodiment

For example, in the communication system S, multi-factor authentication is executed in order to verify the validity of a user. The multi-factor authentication is authentication that combines a plurality of factors. In the first embodiment, two-factor authentication that combines two factors is taken as an example, but multi-factor authentication that combines three or more factors may be used. As the factor itself, it is possible to use any one of various types, examples of which include a biometric factor, a possession factor, and a knowledge factor.

In the multi-factor authentication, authentication data corresponding to the factor is used. As the authentication data itself, it is possible to use any one of various types. For example, in the biometric authentication, biometric data such as a photograph of a face, a feature amount of the face, a photograph of a fingerprint, a feature amount of a fingerprint, a scanned image of a vein, or a feature amount of a vein corresponds to the authentication data. In the possession authentication, possession information such as a one-time password, information recorded in an IC card, or information recorded in a token corresponds to the authentication data. In the knowledge authentication, knowledge information such as a user ID, a password, a PIN, or a secret question corresponds to the authentication data.

In the first embodiment, a case in which the multi-factor authentication is executed in order to log in to an online service is taken as an example, but the multi-factor authentication can be applied to any situation. For example, the multi-factor authentication can be applied to another situation such as a time of applying for an online service, a time of executing electronic payments, or a time of performing an administrative procedure online. Various services can be applied to the online service itself. For example, a financial service, a communication service, a payment service, an electronic commerce service, or a social networking service (SNS) may correspond to the online service.

For example, when a user registers use of an online service, a user ID and a password for login to the online service are issued. The user uses the user PC 30 to access a website of the online service and input the user ID and the password. The authentication server 20 verifies the validity of the user based on the user ID and the password that have been input by the user. Once the validity of the user is verified, the user can log in to the online service.

It requires considerable time and effort to request a user to input the user ID and the password for every login. Thus, it is conceivable to reduce the time and effort for inputting the user ID by multi-factor authentication that combines face authentication and password authentication. However, even in this case, it still requires time and effort to input the password. When a user is allowed to log in only by face authentication without requiring any input to the operating unit 34, there is a possibility that another user having a similar face may be erroneously authenticated. When the photographing unit 36 includes a 3D sensor, the face authentication can be executed with a certain degree of accuracy, but erroneous recognition may still occur. When the photographing unit 36 does not include a 3D sensor, the probability of erroneous recognition increases. There is another possibility that a third party who has somehow obtained the photograph of the face of a user may impersonate the user.

In view of this, in the first embodiment, in order to ensure security without receiving any input from the operating unit 34, the authentication server 20 issues a temporary user ID when a user logs in to an online service. This temporary user ID is hereinafter referred to as "TUID." The TUID is information that can identify a user. The TUID becomes invalid when a predetermined invalidation condition is satisfied. In the first embodiment, a case in which the login of the user to the online service corresponds to the invalidation condition is taken as an example, but the invalidation condition may be any condition. For example, the invalidation condition may be a condition that a predetermined expiration date has expired, that login has occurred a certain number of times, or that the user has performed a predetermined operation.

The TUID issued by the authentication server 20 is recorded in the user PC 30. In the first embodiment, a case in which the TUID is recorded as a cookie for a browser is described, but the TUID may be recorded as information other than the cookie. The TUID may be displayed on the display unit 35, but is assumed to be hidden from the user in principle. For the second and subsequent times of login, TUID authentication using the TUID is executed together with the face authentication. The TUID authentication is not successful unless the TUID authentication is executed from the user PC 30 on which the TUID is recorded, and hence the TUID authentication is a kind of possession authentication. The multi-factor authentication that combines the face authentication and the TUID authentication is considered to be able to ensure a certain degree of security without receiving any input from the operating unit 34.

However, reuse of the same TUID for a long period of time leads to a possibility that the valid TUID may be stolen by a malicious third party. For example, there is a possibility that a cookie may be stolen by a third party through a replay attack and a TUID included in the cookie may also be stolen. Assuming that a third party obtains not only a TUID but also the photograph of the face of a user in some way, impersonation becomes possible. Thus, it is also conceivable to invalidate the TUID after a certain period of time.

However, when the TUID becomes invalid immediately, a user who logs in infrequently is required to input the user ID and the password every time, thereby reducing convenience of the user. In view of this, in the first embodiment, a salt is used to transform a TUID in order to prevent the TUID from being stolen by a third party while enhancing the convenience of the user. However, when the reuse of the same salt for a long period of time leads to a possibility that the salt itself may be stolen by a malicious third party, and hence salts corresponding to days and time slots of login of the user are set to be used.

Figure 2:
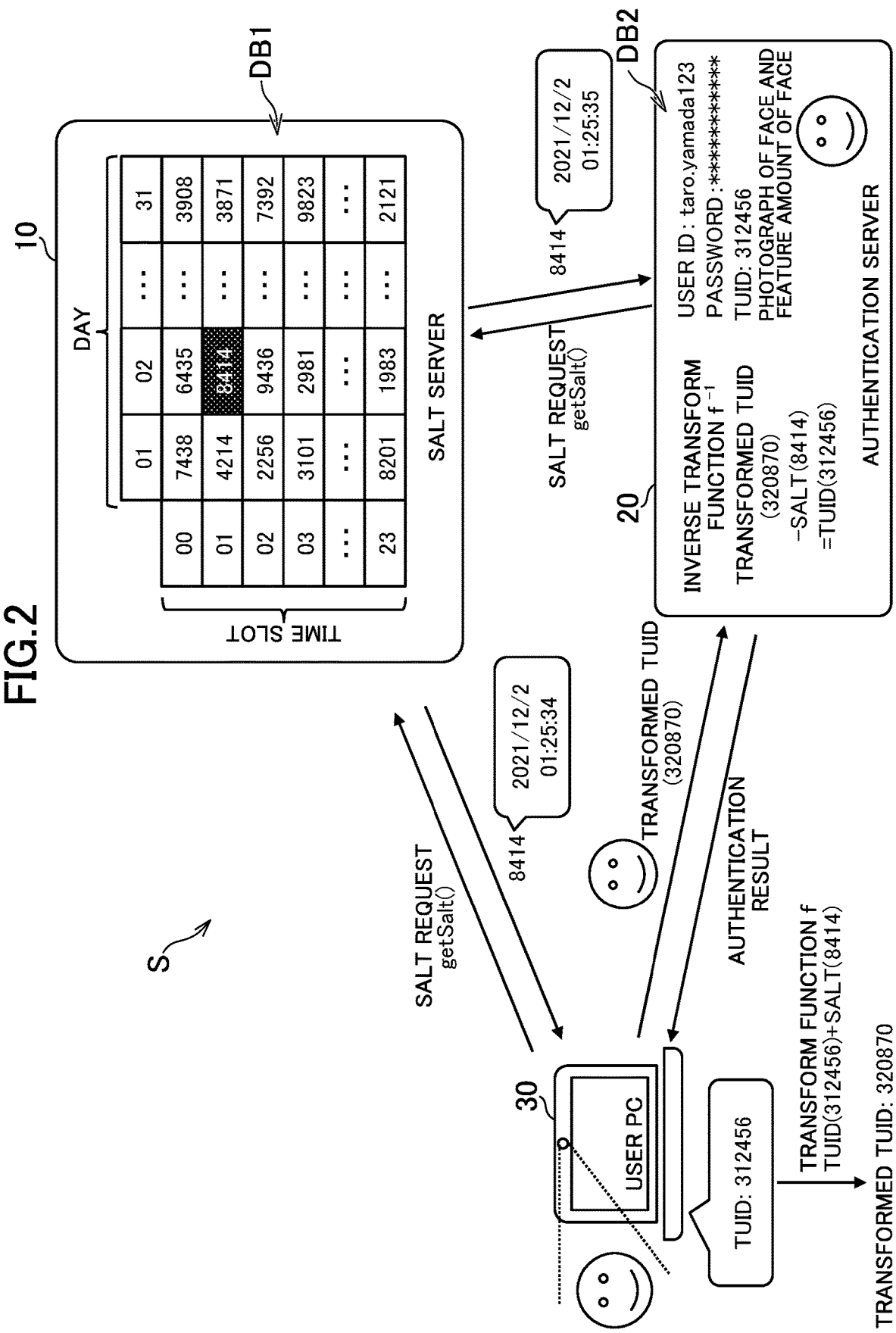
FIG. 2 is a diagram for illustrating an example of a flow of multi-factor authentication in a first embodiment of the present disclosure.

FIG. 2 is a diagram for illustrating an example of a flow of multi-factor authentication in the first embodiment. As illustrated in FIG. 2, when a user is to log in to an online service, the user PC 30 transmits a salt request for acquiring a salt to the salt server 10. In the example of FIG. 2, a command such as getSalt( ) is included in the salt request. This command does not include any salt-related condition, and hence even when a malicious third party steals a glance at the salt request, it is not possible to identify under which condition the salt has been generated.

When the salt server 10 receives a salt request, the salt server 10 refers to a salt database DB1 to acquire a salt corresponding to the current day and time slot. As illustrated in FIG. 2, the salt database DB1 stores a salt for each combination of a day and time slot. For example, assuming that one month has 31 days and 24 hours in a day are divided into hourly time slots, in the example of FIG. 2, 31×24=744 kinds of salts are stored in the salt database DB1. Assuming that the salt server 10 acquires a salt from the salt database DB1 at a time point "01:25:34 on Dec. 2, 2021," the salt server 10 acquires a salt "8414" corresponding to a day "02" and an hour "01" and transmits the salt to the user PC 30.

When the user PC 30 receives the salt "8414" from the salt server 10, the user PC 30 transforms a TUID "312456" based on the salt "8414" and a predetermined transform function "f". In the example of FIG. 2, the transform function "f" is a function that adds the salt "8414" to the TUID "312456". A sum of those, that is, "320870" is obtained as a TUID that has been transformed. The user PC 30 transmits, to the authentication server 20, an authentication request including the photograph of the face of the user generated by the photographing unit 36 and the transformed TUID "320870".

When the authentication server 20 receives the authentication request, the authentication server 20 transmits a salt request to the salt server 10. In the example of FIG. 2, the salt request transmitted from the user PC 30 to the salt server 10 and the salt request transmitted from the authentication server 20 to the salt server 10 have the same format. For this reason, the salt request transmitted from the authentication server 20 to the salt server 10 also includes information such as getSalt( ) from which the condition for a salt cannot be known. The salt requests are set to have a common format, to thereby be able to provide the salt server 10 with a common API as well.

When the salt server 10 receives the salt request from the authentication server 20, the salt server 10 refers to the salt database DB1 to acquire a salt corresponding to the current day and time slot. Assuming that the salt server 10 acquires the salt from a salt database DB1 at a time point "01:25:35 on Dec. 2, 2021," the salt server 10 transmits the salt "8414" corresponding to the day "02" and the hour "01" to the authentication server 20. This salt "8414" is the same as that transmitted to the user PC 30.

When the authentication server 20 receives the salt "8414" from the salt server 10, the authentication server 20 inversely transforms the transformed TUID "320870" received from the user PC based on the salt "8414" and an inverse transform function $f^{-1}$. In the example of FIG. 2, the inverse transform function $f^{-1}$ is a function that subtracts the salt "8414" from the transformed TUID "320870". The authentication server 20 acquires the TUID "312456" by the inverse transformation.

When the authentication server 20 acquires the TUID "312456", the authentication server 20 confirms whether the TUID "312456" is present in a user database DB2. The user database DB2 stores authentication data serving as a correct answer in multi-factor authentication. Processing for confirming the presence or absence of the TUID "312456" corresponds to the TUID authentication. When the TUID "312456" is not stored in the user database DB2, an error occurs at that time point, thereby inhibiting the user from logging in.

When the authentication server 20 confirms that the TUID "312456" is present in the user database DB2, the authentication server 20 acquires the feature amount of the face stored in the user database DB2 in association with the TUID "312456". The authentication server 20 executes the face authentication based on the acquired feature amount of the face and the feature amount of the face calculated from the photograph of the face received from the user PC 30. When the face authentication is successful, the authentication server 20 transmits, to the user PC 30, an authentication result indicating that the multi-factor authentication is successful. When the user PC 30 receives this authentication result, the user PC 30 is brought into a state of having logged in to the online service.

Assuming that, after the user logs in, a malicious third party steals the transformed TUID "320870" and the photograph of the face of the user through cross-site scripting (XSS) attack or the like, there is a risk that it may be possible for a third party to impersonate the user until the salt is changed. To address this problem, the authentication server 20 may issue a new TUID and store the new TUID in the user database DB2 when the user logs in. That is, the authentication server 20 may update the TUID each time the user logs in. Assuming that the new TUID is "417632", the authentication server 20 is only required to transmit an authentication result including the new TUID "417632" to the user PC 30. Thus, the TUID is changed each time the user logs in, and hence even when a third party performs such a cross-site scripting (XSS) attack as described above, authentication cannot be successful, thereby being able to prevent impersonation. The new TUID "417632" may be transformed through use of the salt "8414" that has already been received from the salt server 10. In this case, it is assumed that the authentication server 20 stores a transform function for transforming the new TUID and the user PC 30 stores the inverse transform function $f^{-1}$ for inversely transforming the new TUID that has been transformed. In this inverse transformation as well, the salt "8414" that has already been received from the salt server 10 may be used.

As described above, the communication system S according to the first embodiment transforms the TUID, and inversely transforms the transformed TUID, based on the salt corresponding to the combination of the day and time slot in which the user logs in. Thus, a TUID is not transmitted over the network N as it is, and hence a third party can no longer easily obtain the TUID. In addition, a salt is effective only for a certain period, and hence even when a third party acquires the salt in some way, the period during which this salt is effective can be suppressed to a certain length, thereby enhancing security in communication. Now, details of the communication system S according to the first embodiment are described.

Figure 3:
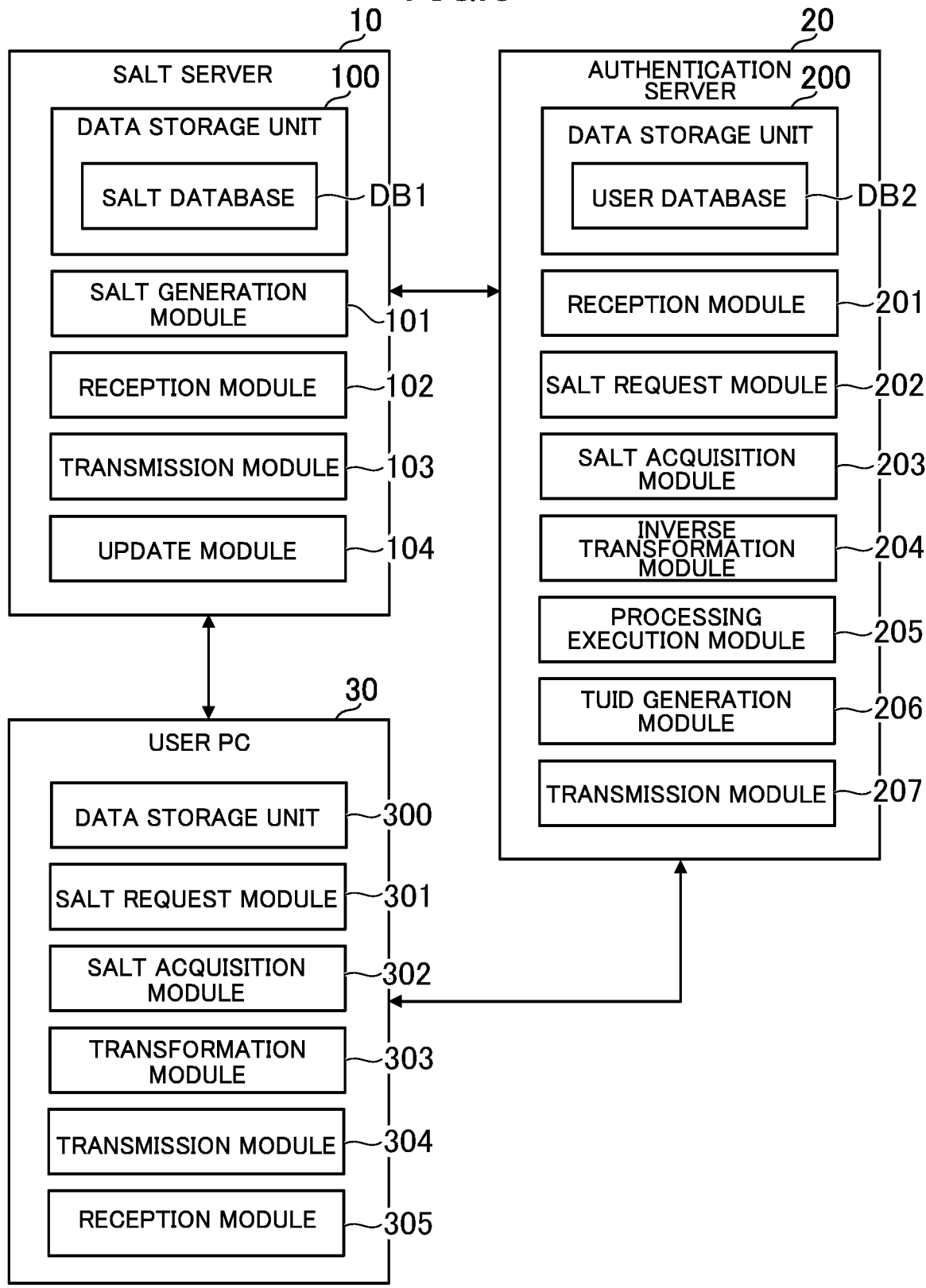
FIG. 3 is a functional block diagram for illustrating an example of functions implemented by a communication system according to the first embodiment.

1-3. Functions Implemented by Communication System According to First Embodiment FIG. 3 is a functional block diagram for illustrating an example of functions implemented by the communication system S according to the first embodiment.

1-3-1. Functions Implemented on Salt Server

A data storage unit 100 is implemented mainly by the storage unit 12. A salt generation module 101, a reception module 102, a transmission module 103, and an update module 104 are implemented mainly by the control unit 11.

[Data Storage Unit]

The data storage unit 100 stores data required for managing salts. For example, the data storage unit 100 stores the salt database DB1 in which each of a plurality of periods and a salt (example of transformation information and inverse transformation information) are associated with each other. The salt server 10 uses the salt database DB1 to manage each of the plurality of periods and the transformation information and inverse transformation information in association with each other. When the transformation information and inverse transformation information are information called by a name other than "salt," it suffices that the salt server 10 uses a database called by a name other than "salt database DB1" to manage the transformation information and the inverse transformation information.

FIG. 4 is a table for showing an example of the salt database DB1. The salt database DB1 is a database in which salts are stored. For example, the salt database DB1 stores a salt for each combination of a day and time slot. That is, in the salt database DB1, a salt and a combination of a day and time slot are associated with each other. The salts stored in the salt database DB1 may be updated at a timing determined in advance.

In the example of FIG. 4, a case in which salts used at past days and times and salts scheduled to be used at future days and times are stored as well is described, but only the salt to be used at the current day and time may be stored in the salt database DB1. For example, when the current time is "01:25:34 on Dec. 2, 2021," only the salt for the day "02" and the hour "01" may be stored in the salt database DB1. In this case, at "02:00:00 on Dec. 2, 2021," only the salt for the day "02" and an hour "02" is stored in the salt database DB1.

The data storage unit 100 can store any data other than that of the salt database DB1. For example, the data storage unit 100 may store an algorithm for generating a salt. The data storage unit 100 may store data relating to an API for exchanging a salt with the authentication server 20 and the user PC 30. In the first embodiment, a common API is used for the authentication server 20 and the user PC 30 so that salt requests having the same format can be received from the authentication server 20 and the user PC 30, but an API for the authentication server 20 and an API for the user PC 30 may be different from each other.

[Salt Generation Module]

The salt generation module 101 generates a salt based on a predetermined algorithm. For example, the salt generation module 101 generates a salt so that the salt becomes a random value. As a method itself of generating a random value, it is possible to use any one of various publicly known methods. For example, a method using a time stamp at a time of the salt generation may be used, or a method using data other than the time stamp may be used. The salt generation module 101 stores the generated salt in the salt database DB1.

In the first embodiment, the salt generation module 101 generates a salt for each combination of a future day and time slot. The salt generation module 101 stores this combination and the generated salt in the salt database DB1 in association with each other. The update module 104, which is described later, may update the salts stored in the salt database DB1 at a predetermined timing. This timing may be any timing, for example, the first day of a certain month, the first day of a certain week, or the beginning of a day.

In the first embodiment, a case in which the same salt is used for the transformation of the TUID and the inverse transformation of the transformed TUID is taken as an example. Thus, the salt is an example of transformation information and is also an example of inverse transformation information. The salt as used herein can be read as "transformation information." The salt as used herein can also be read as "inverse transformation information." The transformation information is an encryption key in cryptography. The inverse transformation information is a decryption key in cryptography. In the first embodiment, the transformation information and the inverse transformation information are the same, and hence the transformation information and the inverse transformation information each correspond to a common key in cryptography. The transformation information and the inverse transformation information may be called by a name other than "key." For example, a password used for file encryption may correspond to the transformation information and the inverse transformation information.

The transformation information and the inverse transformation information may be different from each other. For example, the transformation information may be a public key in cryptography, and the inverse transformation information may be a secret key in cryptography. In contrast, the transformation information may be a secret key in cryptography, and the inverse transformation information may be a public key in cryptography. When the transformation information and the inverse transformation information are different from each other, both the transformation information and the inverse transformation information are stored in the salt database DB1. Of both of those, the transformation information is transmitted to the user PC 30, and the inverse transformation information is transmitted to the authentication server 20. As in the first embodiment, when the transformation information and the inverse transformation information are set to correspond to the combination of the day and time slot, the salt database DB1 stores a combination of the transformation information and the inverse transformation information for each combination of the day and time slot.

[Reception Module]

The reception module 102 receives a salt request from each of the authentication server 20 and the user PC 30. A salt request is information having a predetermined format to be transmitted to request a salt. In FIG. 2, the salt request including a command such as getSalt( ) is illustrated as an example, but the salt request may be any information indicating that a salt has been requested. In the first embodiment, a case in which the salt request received from the authentication server and the salt request received from the user PC 30 have the same format is described, but the formats of those may be different from each other. The salt request is an example of a request for transformation information and is also an example of a request for inverse transformation information. Accordingly, the salt request as used herein can be read as "request for the transformation information" or "request for the inverse transformation information." Those requests can be called by any name other than "salt request."

[Transmission Module]

The transmission module 103 transmits a salt corresponding to inverse transformation information to the authentication server 20. The transmission module 103 transmits a salt corresponding to transformation information to the user PC 30. In the first embodiment, the transmission module 103 transmits, to each of the authentication server 20 and the user PC 30, a salt corresponding to the day and time slot to which a salt acquisition time point at which a salt is acquired belongs. The salt acquisition time point may be any time point between when a salt request is received and when a salt is transmitted. The transmission module 103 refers to the salt database DB1 to identify a combination of a day and time slot to which the salt acquisition time point belongs. The transmission module 103 transmits a salt associated with the identified combination to each of the authentication server 20 and the user PC 30.

For example, it is assumed that the salt server 10 receives a salt request from the authentication server 20 in a first period (in the example of FIG. 2, during the hour "01" on the day "02") to which a certain first time point belongs. The first time point is a time point at which the salt server 10 receives a salt request from the user PC 30. When a salt request is received from the user PC 30 in the first period, the transmission module 103 transmits a first salt to the user PC 30. The first salt is a salt corresponding to the first period. In the example of FIG. 2, the first period is the hour "01" on the day "02", and hence the first salt is the salt "8414" associated with the hour "01" on the day "02" in the salt database DB1. The first salt corresponding to the first period and another salt corresponding to another period are hereinafter referred to simply as "salt" unless distinguished.

When a salt request is received from the authentication server 20 in the first period, the transmission module 103 transmits the first salt to the authentication server 20. That is, when the salt request is received from each of the authentication server 20 and the user PC 30 in the same first period, the transmission module 103 transmits the same first salt to each of the authentication server 20 and the user PC 30. In the first embodiment, it is assumed that, when the salt requests are received from the authentication server 20 and the user PC 30 in mutually different periods, the transmission module 103 transmits mutually different salts to the authentication server 20 and the user PC 30. In this case, the salt used for the transformation of the TUID and the salt used for the inverse transformation of the TUID do not correspond to each other, and hence normal inverse transformation fails to be performed, resulting in a failure in authentication processing. Thus, a flow of a series of steps of authentication processing is performed again.

Only one transmission module 103 is illustrated in FIG. 3, but the transmission of a salt to the user PC 30 and the transmission of a salt to the authentication server 20 can be regarded as separate functions. Thus, the transmission module 103 can be regarded as including a first transmission module 103A that transmits a salt to the user PC 30 when a salt request is received from the user PC 30 and a second transmission module 103B that transmits a salt to the authentication server 20 when a salt request is received from the authentication server 20. When a procedure for transmitting a salt to the user PC 30 and a procedure for transmitting a salt to the authentication server are different, the first transmission module 103A may transmit a salt to the user PC 30 in accordance with the procedure for transmitting a salt to the user PC 30. The second transmission module 103B may transmit a salt to the authentication server 20 in accordance with the procedure for transmitting a salt to the authentication server 20.

[Update Module]

The update module 104 updates the salt database DB1. The update module 104 determines whether or not a predetermined update condition is satisfied, and updates the salt database DB1 when the update condition is satisfied. The update condition is a condition for updating the salt database DB1. Any condition can be set as the update condition. In the first embodiment, a case in which the update condition corresponds to a condition that 00:00 on each day has been reached (date has changed) is taken as an example, but the update condition may be another condition such as a condition that an administrator has performed a predetermined operation, a condition that authentication processing has been executed a predetermined number of times or more, or a condition that a salt has been acquired a predetermined number of times or more.

When the update condition is satisfied, the update module 104 causes the salt generation module 101 to generate a salt, and stores the salt in the salt database DB1. It is assumed that a salt generation condition (for example, time stamp) differs each time the salt database DB1 is updated. Thus, a salt having a different value is generated each time the salt database DB1 is updated. In the data storage example of FIG. 4, the salt database DB1 is updated so that, when 00:00 on each day has been reached, salts for the hour 00:00 to the hour 23:00 on that day are generated.

1-3-2. Functions Implemented on Authentication Server

A data storage unit 200 is implemented mainly by the storage unit 22. A reception module 201, a salt request module 202, a salt acquisition module 203, an inverse transformation module 204, a processing execution module 205, a TUID generation module 206, and a transmission module 207 are implemented.

[Data Storage Unit]

The data storage unit 200 stores data required for communication to/from the user PC 30. In the first embodiment, multi-factor authentication is executed in the communication system S, and hence the data storage unit 200 stores data required for multi-factor authentication. For example, the data storage unit 200 stores the user database DB2.

FIG. 5 is a table for showing an example of the user database DB2. The user database DB2 is a database in which pieces of information on the user are stored. For example, the user database DB2 stores a user ID, a password, a full name, a TUID, the photograph of a face, and the feature amount of the face. The information stored in the user database DB2 may be of any type, and is not limited to the example of FIG. 5. For example, a session ID for maintaining a session with the user PC 30, a past login history of a user, or an online service usage history of the user may be stored in the user database DB2.

The photograph of a face is an example of biometric data (biometric information). The TUID is an example of the authentication data (authentication information) different from biometric data. Accordingly, the photograph of the face as used herein can be read as "biometric data." The TUID as used herein can be read as "authentication data different from biometric data." Any combination of the biometric data and the authentication data different from biometric data may be used. This combination is the combination of factors in multi-factor authentication.

The biometric data is data to be used in biometric authentication. As the biometric data itself, any one of various types of data may be used, and for example, the feature amount of a face may correspond to the biometric data. Information called "template" obtained by transforming the feature amount of the face may correspond to the biometric data. When biometric authentication other than the face authentication is used, biometric data corresponding to biometric authentication may be used. Examples of other biometric data are as described above. The authentication data different from biometric data is information to be used in multi-factor authentication together with biometric data. This authentication data is the possession information or the knowledge information. In a case of multi-factor authentication using three or more factors, there may be a plurality of pieces of authentication data different from biometric data.

The data storage unit 200 can store any data other than the user database DB2. For example, the data storage unit 200 may store the inverse transform function $f^{-1}$. For example, the data storage unit 200 may store an algorithm for generating a TUID.

[Reception Module]

The reception module 201 receives the transformed TUID from the user PC 30. The reception module 201 can receive the transformed TUID obtained as a result of transformation based on a salt corresponding to a freely-set period. The transformed TUID obtained as a result of transformation based on a salt corresponding to the first period described above is an example of first transformed data. Accordingly, the transformed TUID obtained as a result of the transformation based on the salt corresponding to the first period as used herein can be read as "first transformed data." The first transformed data is data obtained by subjecting the TUID, which is an example of original data, to the first transformation corresponding to the first period. The original data is data to be transformed. The original data is data that has not been transformed. The original data corresponds to plaintext in cryptography. In the first embodiment, the original data is authentication data relating to the user of the user PC 30. The original data is data that has not been transformed, and is thus sometimes called "raw data."

In the first embodiment, the reception module 201 receives the transformed TUID and the photograph of a face from the user PC 30. Receiving the photograph of the face refers to receiving image data on an image in which a face has been photographed. The photograph of the face may be a still image, or may be an individual frame included in a moving image. In the first embodiment, a case in which the transformed TUID and the photograph of the face are included in the authentication request is taken as an example. Thus, the reception module 201 receives the transformed TUID and the photograph of the face by receiving the authentication request from the user PC 30. The authentication request is a request for executing multi-factor authentication. The authentication request may be issued by transmitting information having a predetermined format. The authentication request may also include other information. For example, the authentication request may include information that can identify the user PC 30, such as the IP address of the user PC 30.

[Salt Request Module]

The salt request module 202 requests the salt server 10 for a salt. The salt request module 202 transmits a salt request to the salt server 10 to request a salt therefrom. In the first embodiment, the salt request module 202 transmits, to the salt server 10, a salt request that does not include information relating to an acquisition rule for a salt. For example, in a case of acquiring a salt corresponding to a combination of a day and time slot, the acquisition rule is the combination of the day and time slot. The salt request does not include the combination of the day and time slot, and thus does not include the information relating to the acquisition rule.

The fact that the information relating to the acquisition rule is not included in the salt request is the same when another acquisition rule is employed. For example, when a salt different for each day is used without the time slot being taken into consideration, the acquisition rule is only a day. The salt request does not include information relating to a day, and thus does not include the information relating to the acquisition rule. For example, when a salt different for each time slot is used without the day being taken into consideration, the acquisition rule is only a time slot. The salt request does not include information relating to a time slot, and thus does not include the information relating to the acquisition rule.

The salt request may include the acquisition rule for a salt. For example, information to be a seed for generating a salt may be included in the salt request. In this case, the same salt is not to be obtained unless the same seed is used, and hence it is assumed that the authentication server 20 and the user PC 30 share a seed used for generating the salt. For example, as in a second embodiment of the present disclosure described later, a part of the acquisition rule for a salt (in the second embodiment, last two digits of a TUID) may be included in the salt request.

[Salt Acquisition Module]

The salt acquisition module 203 acquires a first salt corresponding to the first period, which is a salt for inversely transforming the transformed TUID. This first salt is an example of the first inverse transformation information. The salt acquisition module 203 is an example of an inverse transformation information acquisition module. Accordingly, the salt acquisition module 203 as used herein can be read as "inverse transformation information acquisition module." The inverse transformation information acquisition module acquires inverse transformation information, for example, a salt. When the inverse transformation information is called by a name other than "salt," the inverse transformation information acquisition module may be called by a name corresponding to this name. For example, when the inverse transformation information is called "key" or "password," the inverse transformation information acquisition module acquires a key or a password.

In the first embodiment, the salt server 10 manages salts, and hence the salt acquisition module 203 acquires a salt from the salt server 10. The salts may be managed by the authentication server 20 itself. In this case, the data storage unit 200 stores the salt database DB1. In addition, in this case, the salt generation module 101, the reception module 102, the transmission module 103, and the update module 104, which have been described as being implemented by the salt server 10, are implemented by the authentication server 20.

In the first embodiment, the salt acquisition module 203 acquires the salt corresponding to the combination of the day and time slot indicated by the first period. The combination of the day and time slot is an example of the first period. Accordingly, the combination of the day and time slot as used herein can be read as "first period." The first period is a period to which a first time point at which the salt is acquired belongs. In the first embodiment, a case in which the first period is represented by a combination of a day and time slot is taken as an example, but the first period may mean only a day, or may mean only a time slot.

The method of dividing the first period is not limited to such hourly basis division as described in the first embodiment. Each individual period may have a length longer or shorter than one hour. The length of one period may be different from the length of another period. Even when the first period has a meaning other than the combination of the day and time slot, the salt acquisition module 203 is only required to acquire the salt corresponding to the first period. It is assumed that the relationship between each individual period and the salt is stored in the salt database DB1.

It suffices that the salt acquisition module 203 acquires the salt corresponding to the first period. For example, the salt acquisition module 203 acquires the first salt associated with the first period in the salt database DB1. After the salt database DB1 is updated, the salt acquisition module 203 acquires the first salt associated with the first period in the updated database. When the period to which the time point at which the salt server 10 receives the salt request from the authentication server 20 belongs is a second period later than the first period, the salt acquisition module 203 acquires the salt corresponding to the second period.

[Inverse Transformation Module]

The inverse transformation module 204 subjects the transformed TUID, which is an example of the first transformed data, to the first inverse transformation corresponding to the first period to acquire the TUID, which is an example of the original data and authentication data. The first inverse transformation is inverse transformation corresponding to the first transformation. The first inverse transformation is decryption in cryptography. When a time point at which the authentication server 20 inversely transforms the transformed TUID is the second period later than the first period, the inverse transformation module 204 subjects second transformed data to second inverse transformation corresponding to the second period to acquire the original data.

The inverse transformation module 204 inversely transforms the transformed TUID based on the first salt corresponding to the first period, to thereby perform the first inverse transformation. It is assumed that the inverse transform function $f^{-1}$ for the first inverse transformation is stored in the data storage unit 200. The inverse transformation module 204 uses the inverse transform function $f^{-1}$ to inversely transform the transformed TUID based on the first salt, which is an example of the inverse transformation information. In the example of FIG. 2, the inverse transformation module 204 inversely transforms the transformed TUID by subtracting the first salt from the transformed TUID to acquire the TUID.

The inverse transformation itself can use various inverse transform functions $f^{-1}$, and is not limited to the subtraction indicated in FIG. 2. The inverse transformation may be performed by, for example, addition, multiplication, division, matrix transformation, another calculation, or a combination thereof. In the example of FIG. 2, for simplification of the description, it is assumed that the transform function "f" and the inverse transform function $f^{-1}$ are a simple addition and a simple subtraction, respectively, but may be complicated calculation formulae to some extent in an actual case. In addition, the inverse transformation is not limited to the decryption in cryptography, but may be decompression of a compressed file. When the decompression corresponds to the inverse transformation, compression corresponds to the transformation. The compression causes a file to be transformed in some way, and thus corresponds to the transformation in the first embodiment. The decompression is processing for restoring a compressed file to an original state thereof, and thus corresponds to the inverse transformation in the first embodiment.

[Processing Execution Module]

The processing execution module 205 executes the authentication processing relating to the user based on the authentication data acquired by the first inverse transformation. In the first embodiment, multi-factor authentication is described as an example of the authentication processing, but the authentication processing may be single-factor authentication. For example, only TUID authentication may be executed without use of face authentication. In addition, processing to be executed by the processing execution module 205 is not limited to the authentication processing as long as the processing execution module 205 executes processing corresponding to a situation in which the communication system S is applied. Processing to be performed when the communication system S is applied to other situations is described in modification examples described later. The processing execution module 205 is only required to execute predetermined processing based on the original data acquired by the inverse transformation module 204.

For example, the processing execution module 205 executes multi-factor authentication based on the TUID inversely transformed by the inverse transformation module 204 and the photograph of the face received by the reception module 201. As described above, as the multi-factor authentication itself, any one of various types can be used. In the first embodiment, the processing execution module 205 refers to the user database DB2 to acquire the feature amount of the face associated with the TUID inversely transformed by the inverse transformation module 204. This feature amount of the face is authentication data to be used as a correct answer in multi-factor authentication. Of the feature amounts of the faces stored in the user database DB2, only the feature amounts of the faces associated with the TUID inversely transformed by the inverse transformation module 204 are subjected to comparison. Other feature amounts of the faces are not subjected to comparison.

The processing execution module 205 calculates the feature amount of the face based on the photograph of the face received by the reception module 201. As a method itself of calculating the feature amount of the face, any one of various calculation methods can be used. For example, the feature amount of the face may be calculated by a calculation method using a contrast filter or principal component analysis. The feature amount of the face can be expressed in any format such as a multidimensional vector, an array, or a single numerical value. The face authentication may be of a type in which two photographs of the faces are input to a machine learning model to determine similarity or dissimilarity instead of a type in which the feature amounts of the faces are compared to each other.

The processing execution module 205 determines the similarity or dissimilarity between the feature amount of the face acquired from the user database DB2 and the feature amount of the face calculated from the photograph of the face received by the reception module 201. For example, when the feature amounts of the faces are expressed by multidimensional vectors, a distance between the feature amounts of the faces in a vector space being smaller than a threshold value corresponds to the feature amounts being similar to each other. The processing execution module 205 determines that the multi-factor authentication is successful when the feature amounts of the faces are similar to each other. The processing execution module 205 determines that the multi-factor authentication has failed when the feature amounts of the faces are not similar to each other.

[TUID Generation Module]

The TUID generation module 206 generates a new TUID when the authentication processing is successful. The TUID generation module 206 generates a TUID based on a predetermined algorithm. The TUID generation module 206 generates a TUID to be newly recorded for the user PC 30 when there is no TUID on the user PC 30. Under a state in which there is a TUID on the user PC 30, in place of this TUID, the TUID generation module 206 generates a TUID (updated TUID) to be written to the user PC 30.

For example, the TUID generation module 206 generates a TUID so that the TUID becomes a random value. As a method itself of generating a random value, any one of various publicly known methods can be used. For example, a method using a time stamp at the time of generating a TUID may be used, or a method using data other than the time stamp may be used. The TUID generation module 206 stores the generated TUID in the user database DB2.

The TUID generation module 206 may generate a TUID so as to avoid duplicating the TUID of another user. The TUID generation module 206 may generate a TUID so as to avoid duplicating the TUID of another user whose face is similar while permitting duplication with the TUID of another user whose face is not similar. The TUID generation module 206 may generate a TUID when the multi-factor authentication is successful. That is, the TUID generation module 206 may generate a TUID each time the user logs in to the online service. When the login is performed for the first time, the TUID generation module 206 generates a TUID when the authentication of the user ID and password is successful.

A timing at which a TUID is generated may be any timing, and is not limited to the example of the first embodiment. For example, instead of invalidating the TUID based on login performed only once, in order to validate the same TUID a predetermined number of times equal to or more than two times, the TUID generation module 206 may generate a TUID each time login occurs the predetermined number of times. For example, when the TUID is provided with an expiration date, the TUID generation module 206 may generate the TUID when the user logs in at a time nearing the expiration date.

[Transmission Module]

The transmission module 207 transmits an authentication result of the multi-factor authentication to the user PC 30. The authentication result is information having a predetermined format that indicates whether or not the multi-factor authentication is successful. For example, the authentication result indicates whether or not login has been permitted. In the first embodiment, a new TUID is generated at a timing of login, and hence the authentication result includes the new TUID.

When the multi-factor authentication is successful, execution of predetermined processing is permitted. In the first embodiment, login to an online service is described as an example of this processing, but this processing may be any processing that is permitted on condition that the multi-factor authentication is successful. This processing may be determined based on a situation in which the communication system S is applied. For example, when the communication system S is applied to a financial service, execution of a transfer may correspond to the predetermined processing. For example, when the communication system S is applied to a payment service, execution of payment may correspond to the predetermined processing. For example, when the communication system S is applied to an electronic commerce service, purchasing a product may correspond to the predetermined processing. The predetermined processing may be any other processing.

1-3-3. Functions Implemented on User PC

A data storage unit 300 is implemented mainly by the storage unit 32. A salt request module 301, a salt acquisition module 302, a transformation module 303, a transmission module 304, and a reception module 305 are implemented mainly by the control unit 31.

[Data Storage Unit]

The data storage unit 300 stores data required for multi-factor authentication. For example, the data storage unit 300 stores a TUID and a transform function "f". When the photographing unit 36 is not used for generating the photograph of the face of the user, the data storage unit 300 may store the image data on the photograph of the face of the user. For example, when an application for an online service is provided, the data storage unit 300 may store this application.

[Salt Request Module]

The salt request module 301 requests the salt server 10 for a salt. The salt request module 301 transmits a salt request to the salt server 10 to request a salt therefrom. In the first embodiment, the salt request module 301 transmits, to the salt server 10, a salt request that does not include information relating to an acquisition rule for a salt. This point is the same with the salt request module 202 of the authentication server 20. Other points relating to the salt request are also as described in the processing of the salt request module 202.

In the first embodiment, the salt request module 301 requests the salt server 10 for a salt when the photographing unit 36 generates a photograph of the face. The salt request module 301 may request a salt at any timing, which is not limited to the timing at which the photograph of the face is generated. For example, the salt request module 301 may request a salt at a timing at which the application for the online service is activated, at a timing at which the user performs an operation for login, or at a timing at which the website of the online service is accessed.

[Salt Acquisition Module]

The salt acquisition module 302 acquires a first salt corresponding to the first period, which is a salt for transforming the TUID being an example of original data. This first salt is an example of the first transformation information. The salt acquisition module 302 is an example of a transformation information acquisition module. Accordingly, the salt acquisition module 302 as used herein can be read as "transformation information acquisition module." The transformation information acquisition module acquires transformation information, for example, a salt. When the transformation information is called by a name other than "salt," the transformation information acquisition module may be called by a name corresponding to this name. For example, when the transformation information is called "key" or "password," the transformation information acquisition module acquires a key or a password.

In the first embodiment, the acquisition of a salt from the salt server 10 to the user PC 30 and the acquisition of a salt from the salt server 10 to the authentication server 20 are performed by the same procedure, and hence the processing of the salt acquisition module 302 is the same as that of the salt acquisition module 203 of the authentication server 20. For this reason, the same applies to points that a salt is acquired from the salt server 10 and that the salt corresponding to the combination of the day and time slot is acquired.

In the first embodiment, the first period is represented by a combination of a day and time slot, and hence the salt acquisition module 302 acquires the first salt corresponding to the combination of a day and time slot indicated by the first period. The salt acquisition module 302 acquires the first salt associated with the first period in the salt database DB1. After the salt database DB1 is updated, the salt acquisition module 302 acquires the first salt associated with the first period in the updated salt database DB1. The salt acquisition module 302 acquires the first salt from the salt server 10.

[Transformation Module]

The transformation module 303 generates first transformed data by subjecting the TUID, which is an example of the original data and authentication data, to the first transformation corresponding to the first period to which the first time point at which the TUID is transformed belongs. The first transformation is transformation corresponding to the first period. In the first embodiment, transformation based on the first salt corresponding to the first period corresponds to the first transformation. When a second time point different from the first time point belongs to the same first period to which the first time point belongs, the first transformation is performed. Thus, when the TUID is transformed at the second time point belonging to the first period and being different from the first time point, the transformation module 303 performs the first transformation on the TUID to generate the first transformed data.

Meanwhile, in the second period different from the first period, the second transformation different from the first transformation is performed. Thus, when the TUID is transformed at a third time point belonging to the second period different from the first period and being different from the first time point and the second time point, the transformation module 303 performs the second transformation corresponding to the second period on the TUID to generate the second transformed data. In the first embodiment, transformation based on the second salt corresponding to the second period corresponds to the second transformation. The transform function "f" is itself the same for the first transformation and the second transformation, but the salt to be input to the transform function "f" is the first salt for the first transformation and is the second salt for the second transformation. Thus, the first transformation and the second transformation are mutually different kinds of transformation. That is, the first salt, which is an example of the first transformation information used for the first transformation, and the second salt, which is an example of the second transformation information used for the second transformation, are different from each other.

The transformation module 303 transforms the TUID based on the first salt, to thereby perform the first transformation. The transformation is encryption in cryptography. It suffices that the transformation involves changing the TUID in some way. For example, inputting the TUID into some function, changing a part of the TUID, changing the entire TUID, adding some information to the TUID, or deleting a part of the TUID corresponds to the transformation. The inverse transformation may be any processing in a reverse direction thereto (processing for restoring the original TUID). As described above, the compression of a file may correspond to the transformation, and the decompression of a file may correspond to the inverse transformation. In this case, the first salt is used as a password to execute compression or decompression.

The transform function "f" for the transformation is assumed to be stored in the data storage unit 300. The transformation module 303 uses the transform function "f" to transform the TUID that has not been transformed based on the salt, which is an example of the transformation information. In the example of FIG. 2, the transformation module 303 transforms the TUID that has not been transformed by adding the salt to the TUID that has not been transformed, to thereby acquire the transformed TUID. The transformation itself can use any one of various transform functions, and is not limited to the addition indicated in FIG. 2. The transformations may be performed by, for example, subtraction, multiplication, division, matrix transformation, another calculation, or a combination thereof.

[Transmission Module]

The transmission module 304 transmits the transformed TUID to the authentication server 20. For example, the transmission module 304 transmits the transformed TUID and the photograph of the face to the authentication server 20. In the first embodiment, a case in which the transformed TUID and the photograph of the face are included in the authentication request is taken as an example. Thus, the transmission module 304 transmits the transformed TUID and the photograph of the face by transmitting the authentication request including the transformed TUID and the photograph of the face to the authentication server 20. The transmission module 304 is not required to transmit the transformed TUID and the photograph of the face collectively as one piece of data. The transmission module 304 may transmit the transformed TUID and the photograph of the face separately. Instead of being transmitted as it is, the photograph of the face may also be transformed based on a salt or another encryption key. The feature amount of the face may be calculated on the user PC 30 side, and the calculated feature amount of the face may be transmitted as the biometric data.

[Reception Module]

The reception module 305 receives the authentication result from the authentication server 20. When this authentication result indicates success, the user logs in to the online service. That is, the execution of the predetermined processing described above is permitted. When a new TUID is included in the authentication result, the reception module 305 records the TUID included in the authentication result in the data storage unit 300. The old TUID recorded so far is discarded from the data storage unit 300.

Figure 6:
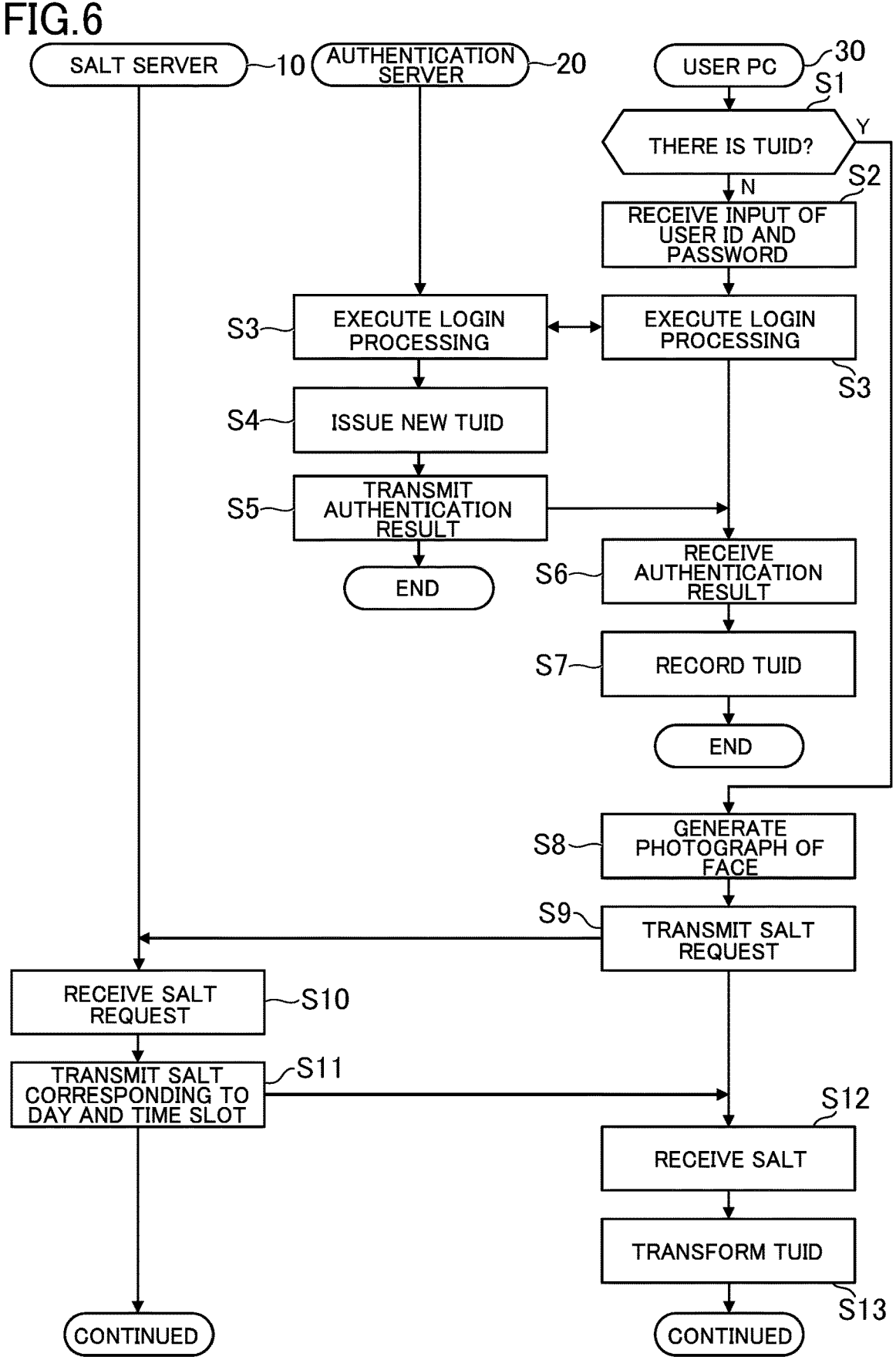
FIG. 6 is a diagram for illustrating an example of processing to be executed by the communication system according to the first embodiment.
Figure 7:
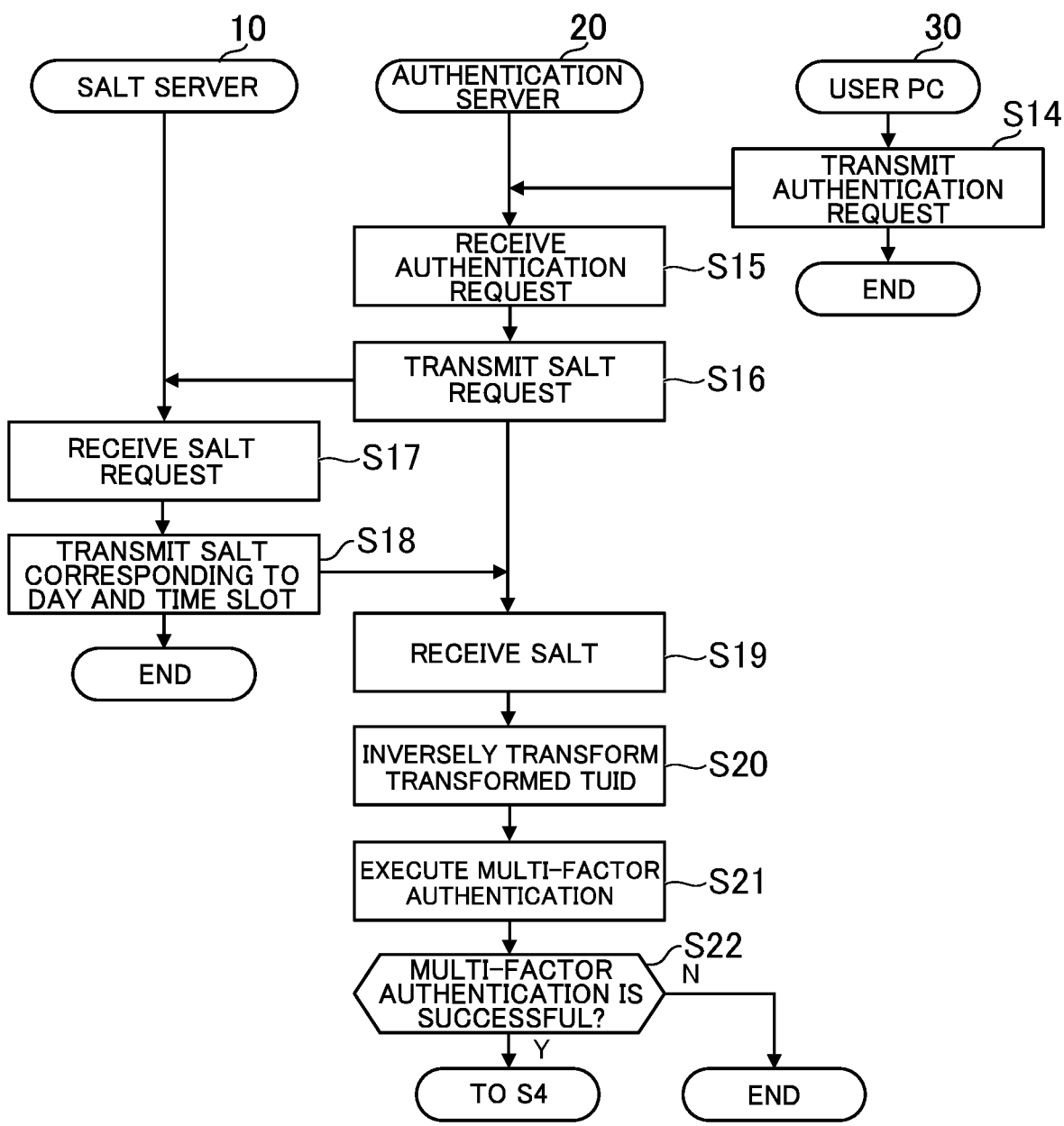
FIG. 7 is a diagram for illustrating an example of the processing to be executed by the communication system according to the first embodiment.

1-4. Processing to be Executed by Communication System According to First Embodiment FIG. 6 and FIG. 7 are diagrams for illustrating an example of processing to be executed by the communication system S according to the first embodiment. The control units 11, 21, and 31 execute programs stored in the storage units 12, 22, and 32, respectively, to thereby execute the processing of FIG. 6 and FIG. 7. It is assumed that the user ID and password of the user have already been issued for the execution of the processing of FIG. 6 and FIG. 7. It is also assumed that the salt has already been stored in the salt database DB1.

As illustrated in FIG. 6, the user PC 30 activates an application of an online service, and determines whether or not there is a TUID in the storage unit 32 (Step S1). When it is determined that there is no TUID (N in Step S1), the user PC 30 receives the input of a user ID and password by the user based on a detection signal obtained by the operating unit 34 (Step S2). Login processing for logging in to the online service is executed between the authentication server 20 and the user PC 30 (Step S3). In Step S3, the validity of the user ID and password is verified based on the user database DB2. When the login is successful, the authentication server 20 issues a new TUID (Step S4), and transmits an authentication result including the new TUID to the user PC 30 (Step S5).

When the user PC 30 receives the authentication result (Step S6), the user PC 30 records the TUID included in the authentication result in the storage unit 32 (Step S7), and this processing ends. In Step S7, the TUID may be recorded as a part of a cookie. After that, the user PC 30 executes processing for allowing the user to use the online service. When the user performs an operation for logging out of the online service, logout processing for logging out of the online service is executed between the authentication server 20 and the user PC 30.

When it is determined in Step S1 that there is a TUID (Y in Step S1), the user PC 30 photographs the face of the user based on the photographing unit 36 to generate a photograph of the face (Step S8). The user PC 30 transmits a salt request to the salt server 10 (Step S9). When the salt server 10 receives the salt request (Step S10), the salt server 10 transmits, to the user PC 30, the salt corresponding to the current day and time slot based on the salt database DB1 (Step S11). When the user PC 30 receives the salt from the salt server 10 (Step S12), the user PC 30 transforms the TUID stored in the storage unit 32 based on this salt (Step S13).

Referring now to FIG. 7, the user PC 30 transmits, to the authentication server 20, an authentication request including the TUID transformed in Step S13 and the photograph of the face generated in Step S8 (Step S14). When the authentication server receives the authentication request (Step S15), the authentication server 20 transmits a salt request to the salt server 10 (Step S16). When the salt server 10 receives the salt request (Step S17), the salt server 10 transmits, to the authentication server 20, the salt corresponding to the current day and time slot based on the salt database DB1 (Step S18).

When the authentication server 20 receives the salt from the salt server 10 (Step S19), the authentication server 20 inversely transforms the transformed TUID included in the authentication request received in Step S15 based on this salt (Step S20). The authentication server 20 executes multi-factor authentication based on the TUID inversely transformed in Step S20 and the photograph of the face included in the authentication request received in Step S15 (Step S21). In Step S21, the authentication server 20 acquires the feature amount of the face associated with the TUID inversely transformed in Step S20 based on the user database DB2. The authentication server 20 calculates the feature amount of the face based on the photograph of the face received in Step S15. The authentication server 20 determines whether or not a degree of similarity between the acquired feature amounts of the faces is equal to or larger than a threshold value. When the TUID is present in the user database DB2 and the degree of similarity between the feature amounts of the faces is equal to or larger than the threshold value, the multi-factor authentication is successful.

The authentication server 20 determines whether or not the multi-factor authentication is successful (Step S22). When the multi-factor authentication fails (N in Step S22), this processing ends. In this case, the input of the user ID and password may be requested. When the multi-factor authentication is successful (Y in Step S22), the user is permitted to log in to the online service, and the process advances to the processing step of Step S4. The TUID of the user PC 30 is updated in the processing step of Step S4 and the subsequent steps.

According to the communication system S of the first embodiment, the user PC 30 performs the first transformation corresponding to the first period on a TUID to generate a transformed TUID. The user PC 30 transmits the transformed TUID to the authentication server 20. The authentication server 20 receives the transformed TUID from the user PC 30. The authentication server 20 subjects the transformed data to the first inverse transformation corresponding to the first period to acquire the TUID. Thus, the transformed TUID is transmitted over a network, and the TUID is not acquired by a third party, thereby enhancing security in communication. Even when a third party acquires a mechanism for the first transformation in some way, a period during which this mechanism can be used is limited, and hence a period over which the third party keeps committing a fraud can be suppressed to a certain length, thereby enhancing security in communication.

Further, even in a case in which the first time point and the second time point are different from each other, when the first time point and the second time point belong to the same first period, the user PC 30 performs the first transformation. When a TUID is transformed at the third time point belonging to the second period different from the first period, the user PC performs the second transformation on the TUID. The authentication server 20 acquires the TUID by performing the first inverse transformation in the first period. The authentication server 20 acquires the TUID by performing the second inverse transformation in the second period. Thus, different kinds of transformation can be performed in the first period and the second period, and hence even when a third party acquires the mechanism for the first transformation in some way, the first transformation can no longer be used in the second period, thereby enhancing security in communication.

Further, the user PC 30 performs the first transformation by transforming a TUID based on the first salt. The authentication server 20 performs the first inverse transformation by inversely transforming the transformed TUID based on the first salt. Thus, the salt to be used is changed in accordance with the period without changing the transform function "f" and the inverse transform function $f^{-1}$, thereby enhancing security in communication.

Further, the authentication server 20 and the user PC 30 each acquire the first salt corresponding to the combination of a day and time slot indicated by the first period. Thus, the period during which the first salt is effective can be set in units of time slots, and hence the period during which the first salt is effective can be set relatively short. Even when the first salt is acquired by a third party, the period during which this first salt can be used is short, thereby effectively enhancing security in communication.

Further, the authentication server 20 and the user PC 30 each acquire the first salt associated with the first period in the salt database DB1. Thus, the first salt is stored in the salt database DB1 in advance, and hence it is not required to generate the first salt immediately, thereby being able to simplify processing required at a time of communication. As a result, a processing load on the salt server 10 is reduced, and a time required to complete authentication processing is shortened.

The salt server 10 also updates the salt database DB1. Thus, the same salt is not to be used for a long period of time, thereby enhancing security in communication.

Further, the authentication server 20 and the user PC 30 each transmit a salt request to the salt server 10. The salt server 10 transmits the first salt to each of the authentication server 20 and the user PC 30. The authentication server 20 and the user PC 30 each acquire the first salt from the salt server 10. Thus, the authentication server 20 is not required to manage first salts, to thereby be able to distribute processing loads in communication. That is, the processing required for communication can be distributed between the salt server 10 and the authentication server 20. Accordingly, it is possible to reduce a processing load on the authentication server 20.

Further, the authentication server 20 and the user PC 30 each transmit a salt request that does not include information relating to the acquisition rule for the first salt to the salt server 10. Thus, even when a malicious third party steals the salt request, it is difficult to decipher a mechanism for the transformation of a TUID. For example, even when a salt corresponding to a day and time slot has been acquired, the acquisition rule cannot be grasped based only on the salt request, thereby further enhancing security in communication.

Further, the authentication server 20 executes authentication processing based on a TUID acquired by the first inverse transformation, and generates a new TUID when the authentication processing is successful. This enhances security at a time of authentication. For example, a TUID is changed each time a user logs in, and hence even when a third party performs the above-mentioned cross-site scripting attack or the like, authentication cannot be successful, thereby being able to prevent impersonation.

2. Second Embodiment

In the first embodiment, the case in which the salt corresponding to the day and time slot is used has been described. A method of acquiring the salt is not limited to the example of the first embodiment. In the second embodiment, a case in which a salt corresponding to a combination of a day on which the salt is acquired and a part of the TUID is used is described. In the following second and third embodiments of the present disclosure, description of the same points as in the first embodiment is omitted.

Figure 8:
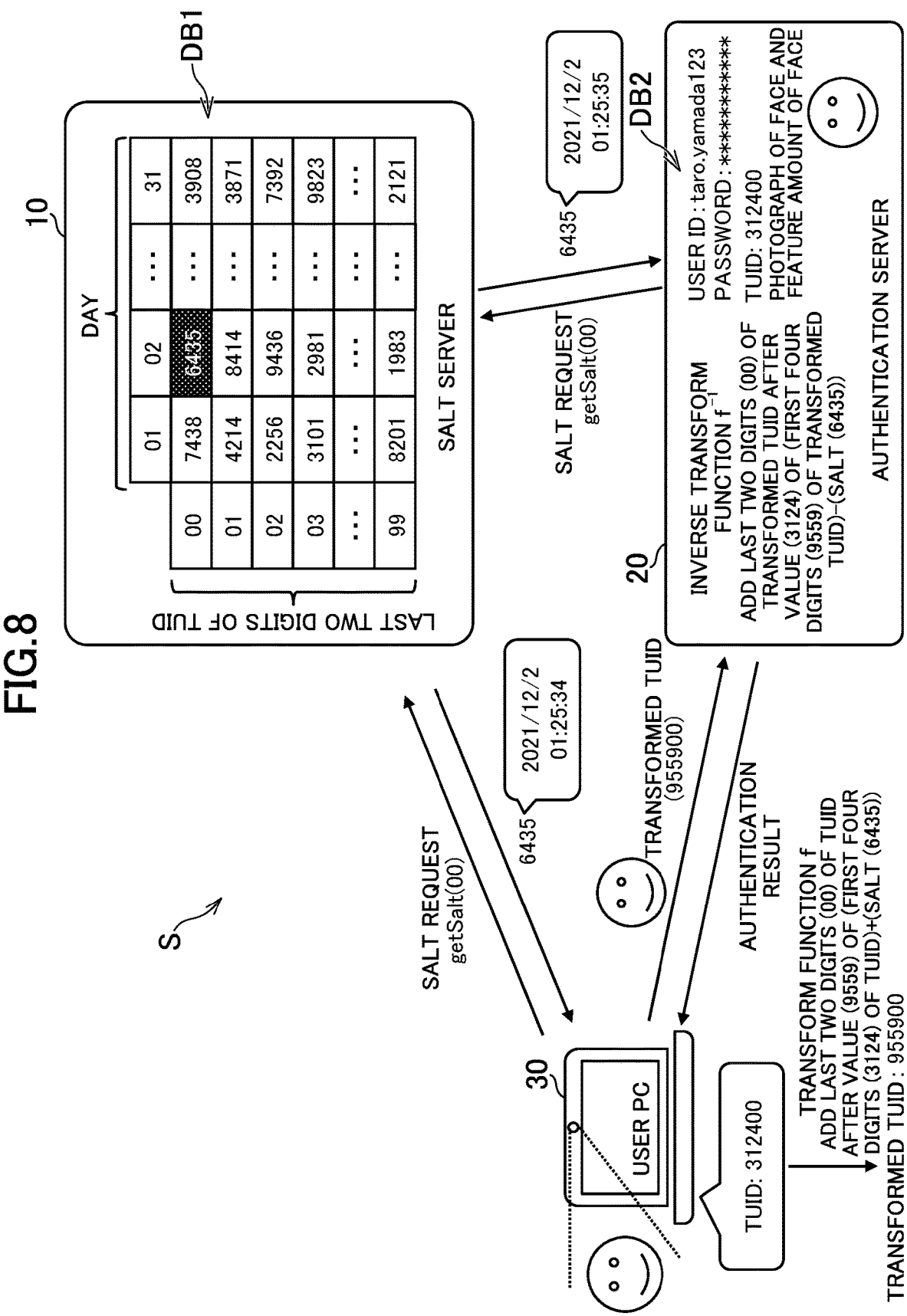
FIG. 8 is a diagram for illustrating an example of a flow of multi-factor authentication in a second embodiment of the present disclosure.

FIG. 8 is a diagram for illustrating an example of a flow of multi-factor authentication in the second embodiment. As illustrated in FIG. 8, a general flow is the same as that of the first embodiment, but the method of acquiring the salt is different from that of the first embodiment. For example, the salt database DB1 stores a salt for each combination of a day and last two digits of a TUID. The user PC 30 transmits a salt request including last two digits "00" of a TUID "312400" to the salt server 10. Even when a malicious third party steals the last two digits of a TUID, the malicious third party cannot steal the TUID itself and cannot grasp the acquisition rule for a salt based only on the numerical value "00".

When the salt server 10 receives the salt request, the salt server 10 refers to the salt database DB1 to acquire a salt corresponding to the combination of the current day and last two digits of the TUID included in the salt request. In the example of FIG. 8, the salt server 10 transmits, to the user PC 30, a salt "6435" corresponding to the day "02" on which the salt request is received from the user PC 30 and the last two digits "00" of the TUID.

When the user PC 30 receives the salt "6435" from the salt server 10, the user PC 30 transforms the TUID "312400" based on this salt "6435". In the example of FIG. 8, a transform function "f" for adding the last two digits "00" of the TUID after "9559" obtained by adding the salt "6435" to first four digits "3124" of the TUID is used to obtain "955900" as the transformed TUID. The user PC 30 transmits, to the authentication server 20, an authentication request including the photograph of the face of the user generated by the photographing unit 36 and the transformed TUID "955900".

When the authentication server 20 receives the authentication request, the authentication server 20 transmits, to the salt server 10, a salt request including the last two digits "00" of the transformed TUID "955900". When the salt server 10 receives the salt request, the salt server 10 refers to the salt database DB1 to transmit, to the authentication server 20, the salt "6435" corresponding to the combination of the current day "02" and the last two digits "00" of the TUID included in the salt request.

When the authentication server 20 receives the salt "6435" from the salt server 10, the authentication server 20 inversely transforms the transformed TUID "955900" received from the user PC based on this salt "6435". In the example of FIG. 8, a transform function $f^{-1}$ for adding the last two digits "00" of the transformed TUID after the value obtained by subtracting the salt "6435" from first four digits "9559" of the transformed TUID "955900" is used. The authentication server 20 acquires the first four digits "3124" of the TUID by the inverse transformation. The authentication server 20 adds the last two digits "00" of the TUID to the first four digits "3124" of the TUID to acquire the TUID "312400". The subsequent flow of the multi-factor authentication is the same as in the first embodiment.

The functional blocks of the second embodiment are the same as those of the first embodiment. The salt acquisition modules 203 and 302 each acquire the salt corresponding to the last two digits of the TUID. The last two digits of the TUID are an example of the part of the TUID. Thus, the last two digits of the TUID as used herein can be read as "part of the TUID." The part of the TUID may be any part, and is not limited to the last two digits of the TUID. For example, the part of the TUID may be the first digit of the TUID, or may be any one of the second to fourth digits of the TUID. The part of the TUID is not required to be consecutive digits, and, for example, may be the first and last digits of the TUID. The length of the part of the TUID may also be any length.

In the second embodiment, a case in which the salt acquisition modules 203 and 302 each acquire the salt corresponding to the day on which the salt is acquired (example of the first period) and the last two digits of the TUID (example of a part of original data) is described, but the salt acquisition modules 203 and 302 may each acquire the salt corresponding to the time slot in which the salt is acquired and the last two digits of the TUID. In this case, it is assumed that a salt is defined for each combination of those factors in the salt database DB1. Through combination of the first embodiment and the second embodiment, the salt acquisition modules 203 and 302 may each acquire a salt corresponding to a combination of three factors, such as the day, the time slot, and the last two digits of the TUID. In this case, it is assumed that a salt is defined for each combination of those three factors in the salt database DB1.

The first transformation in the second embodiment is transformation corresponding to the first period and the part of the TUID. The transformation module 303 transforms a remaining part of the TUID other than the last two digits based on the first transformation information, to thereby generate the first transformed data. The remaining part is a part other than the part of the original data. When the TUID has six digits, the remaining part is first four digits thereof. A transformation method itself using a salt is as described in the first embodiment.

The transmission module 304 further transmits, to the authentication server 20, the last two digits of the untransformed TUID. Those last two digits correspond to plaintext in cryptography. In the second embodiment, a case in which those last two digits are included as the last two digits of the transformed TUID is described, but those last two digits may be transmitted as information separate from the transformed TUID. Even in a case of transmitting the transformed TUID by including those last two digits therein, those last two digits may be added to a position (for example, first two digits) different from the original position (last two digits). Those last two digits are an example of an untransformed part. Thus, those last two digits as used herein can be read as "untransformed part." As described above, this part is not limited to the last two digits.

The reception module 201 further receives the last two digits of the untransformed TUID from the user PC 30. In the second embodiment, the last two digits of the untransformed TUID are included as the part of the transformed TUID, and hence the reception module 201 receives the last two digits of the untransformed TUID by receiving the transformed TUID. When the last two digits of the untransformed TUID are transmitted as information different from the transformed TUID, the reception module 201 may receive the last two digits of the untransformed TUID transmitted as the different information. The salt acquisition module 203 acquires the salt corresponding to the day on which the salt is acquired (example of the first period) and the last two digits of the untransformed TUID. The method of acquiring the salt performed by the salt acquisition module 203 is the same as the method of acquiring the salt performed by the salt acquisition module 302.

The first inverse transformation in the second embodiment is inverse transformation corresponding to the first period and the untransformed part. The inverse transformation module 204 acquires the remaining part by inversely transforming the remaining part (first four digits) of the transformed TUID, which is an example of the first transformed data, based on the inverse transformation information, and acquires the TUID based on the remaining part and the untransformed part. In the example of FIG. 8, the inverse transformation module 204 acquires the first four digits "3124" of the TUID by the inverse transformation, and thus acquires the TUID "312400" based on the first four digits "3124" and the last two digits "00" received from the user PC 30. In the example of FIG. 8, a case in which the last two digits "00" is added to the first four digits "3124" is described, but it suffices that the TUID being the original data is acquired based on a concatenation rule defined in advance.

According to the communication system S of the second embodiment, the user PC 30 acquires the first salt corresponding to the first period and the last two digits of a TUID, and transmits the last two digits of the untransformed TUID. The authentication server 20 receives the last two digits of the untransformed TUID from the user PC 30, and acquires the first salt corresponding to the first period and the last two digits of the untransformed TUID. Thus, the transformed TUID is transmitted over a network, and it becomes difficult for a third party to acquire the TUID, thereby enhancing security in multi-factor authentication. Even when a malicious third party steals the salt request, it is difficult to grasp the mechanism for the transformation based only on the last two digits of the TUID, thereby further enhancing security in communication.

Further, the user PC 30 transforms the first four digits, which are the remaining part of a TUID other than the last two digits, based on the first salt, to thereby generate the first four digits of the transformed TUID. The authentication server acquires the first four digits of the TUID by inversely transforming the first four digits of the transformed TUID based on the first salt, and acquires the TUID based on the first four digits and the untransformed last two digits. Thus, even when a TUID is divided into a plurality of parts, the authentication server 20 can acquire the TUID from the combined parts and reliably complete authentication processing.

3. Third Embodiment

In the first embodiment and the second embodiment, the case in which security in communication is enhanced by devising the method of acquiring the salt has been described. A method of enhancing security in communication is not limited to the examples of the first embodiment and the second embodiment. In the third embodiment, the user PC 30 enhances security in communication by selectively using the transform function "f" in accordance with the time slot in which the TUID is transformed. The user PC 30 stores a plurality of transform functions "f" in advance, and can transform the TUID through use of any one of the transform functions "f".

Figure 9:
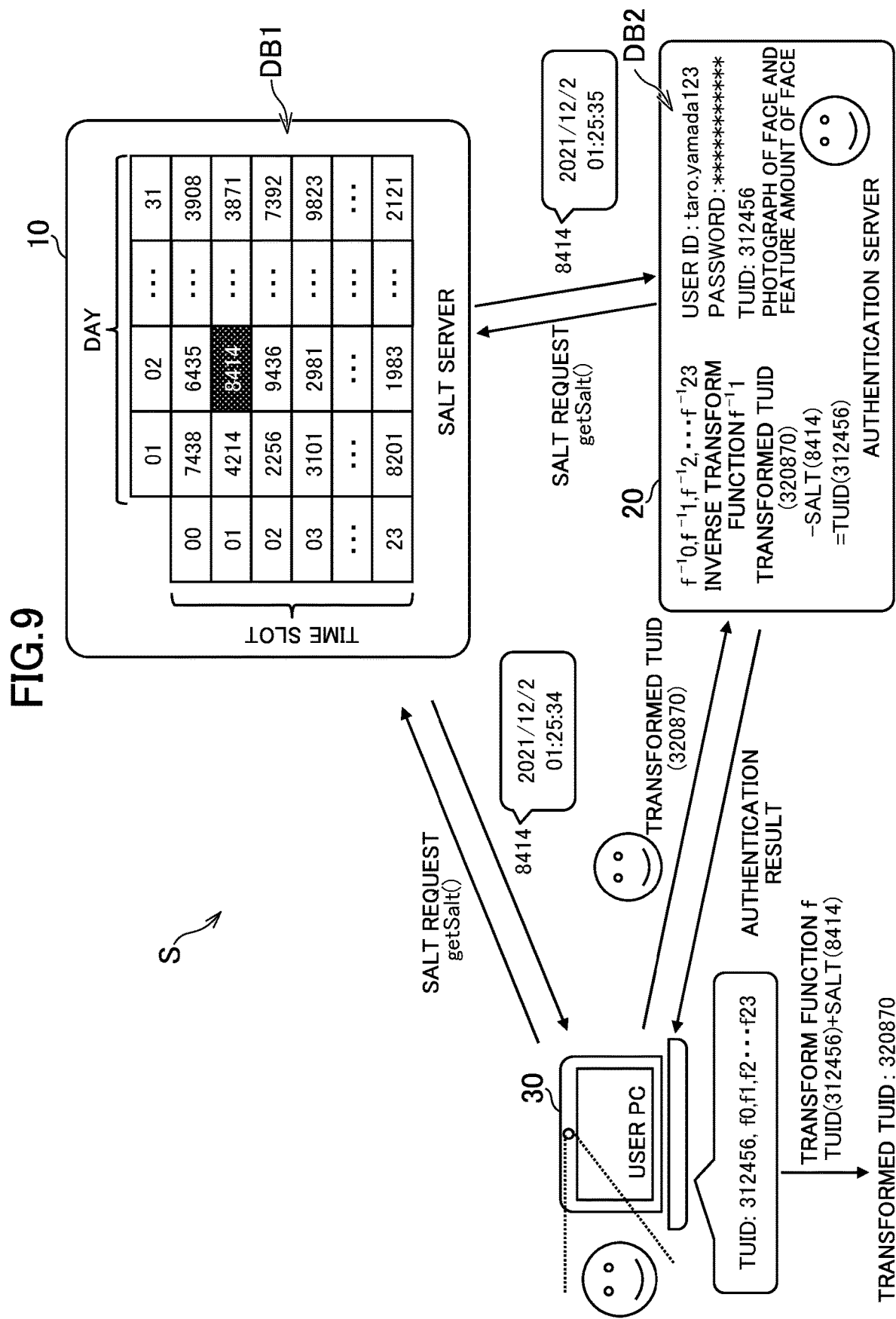
FIG. 9 is a diagram for illustrating an example of a flow of multi-factor authentication in a third embodiment of the present disclosure.

FIG. 9 is a diagram for illustrating an example of a flow of multi-factor authentication in the third embodiment. In the third embodiment, a general flow may be the same as in the first embodiment and the second embodiment. In the example of FIG. 9, the same method of acquiring the salt as that of the first embodiment is taken as an example. A flow to be performed until the user PC 30 acquires a salt is the same as in the first embodiment. The user PC 30 acquires the salt "8414" corresponding to the current day "02" and the time slot "01:00" from the salt server 10.

In the third embodiment, the user PC 30 selectively uses the transform function "f" based on the time slot in which the TUID is transformed. For example, the user PC 30 stores transform functions f0 to f23 corresponding to the time slots from the hour "00" to the hour "23", respectively. The transform functions f0 to f23 are hereinafter referred to simply as "transform function f" unless distinguished. It is assumed that calculation methods indicated by the individual transform functions "f" are different from each other. Thus, even with the same salt being used, when the transform function "f" differs, the value of the transformed TUID differs as well.

In the example of FIG. 9, the time slot in which the TUID is transformed is the hour "01", and hence the user PC 30 selects the transform function f1 from among the transform functions f0 to f23. The transform function f1 is assumed to be the same as the transform function "f" described in the first embodiment with reference to FIG. 2. Thus, the user PC 30 transforms the TUID in the same manner as in the first embodiment, and transmits the transformed TUID to the authentication server 20. When the authentication server 20 receives the transformed TUID, the authentication server 20 acquires a salt from the salt server 10 in the same manner as in the first embodiment.

In the third embodiment, the authentication server 20 selectively uses the inverse transform function $f^{-1}$ based on the time slot in which the TUID is transformed. For example, the authentication server 20 stores inverse transform functions $f^{-1}0$ to $f^{-1}23$ corresponding to the time slots from the hour "00" to the hour "23", respectively. The inverse transform functions $f^{-1}0$ to $f^{-1}23$ are hereinafter referred to simply as "inverse transform function $f^{-1}$" unless distinguished. The calculation methods indicated by the individual inverse transform functions $f^{-1}$ are different from each other. Thus, with the same salt being used, when the inverse transform function $f^{-1}$ differs, the value of the inversely transformed TUID differs as well.

The calculation method indicated by each individual inverse transform function $f^{-1}$ corresponds to the transform function "f" associated with the same time slot. In order to obtain a correct TUID, it is required to perform inverse transformation through use of the inverse transform function $f^{-1}$ corresponding to the transform function "f" used by the user PC 30. In the example of FIG. 9, the time slot in which the TUID is inversely transformed is the hour "01", and hence the inverse transform function $^{-1}f1$ is selected from among the inverse transform functions $f^{-1}0$ to $f^{-1}23$. The inverse transform function $f^{-1}1$ corresponds to the transform function f1 used by the user PC 30. Thus, the authentication server 20 can acquire a correct TUID by transforming the TUID in the same manner as in the first embodiment. The subsequent flow of the multi-factor authentication is the same as in the first embodiment.

Figure 10:
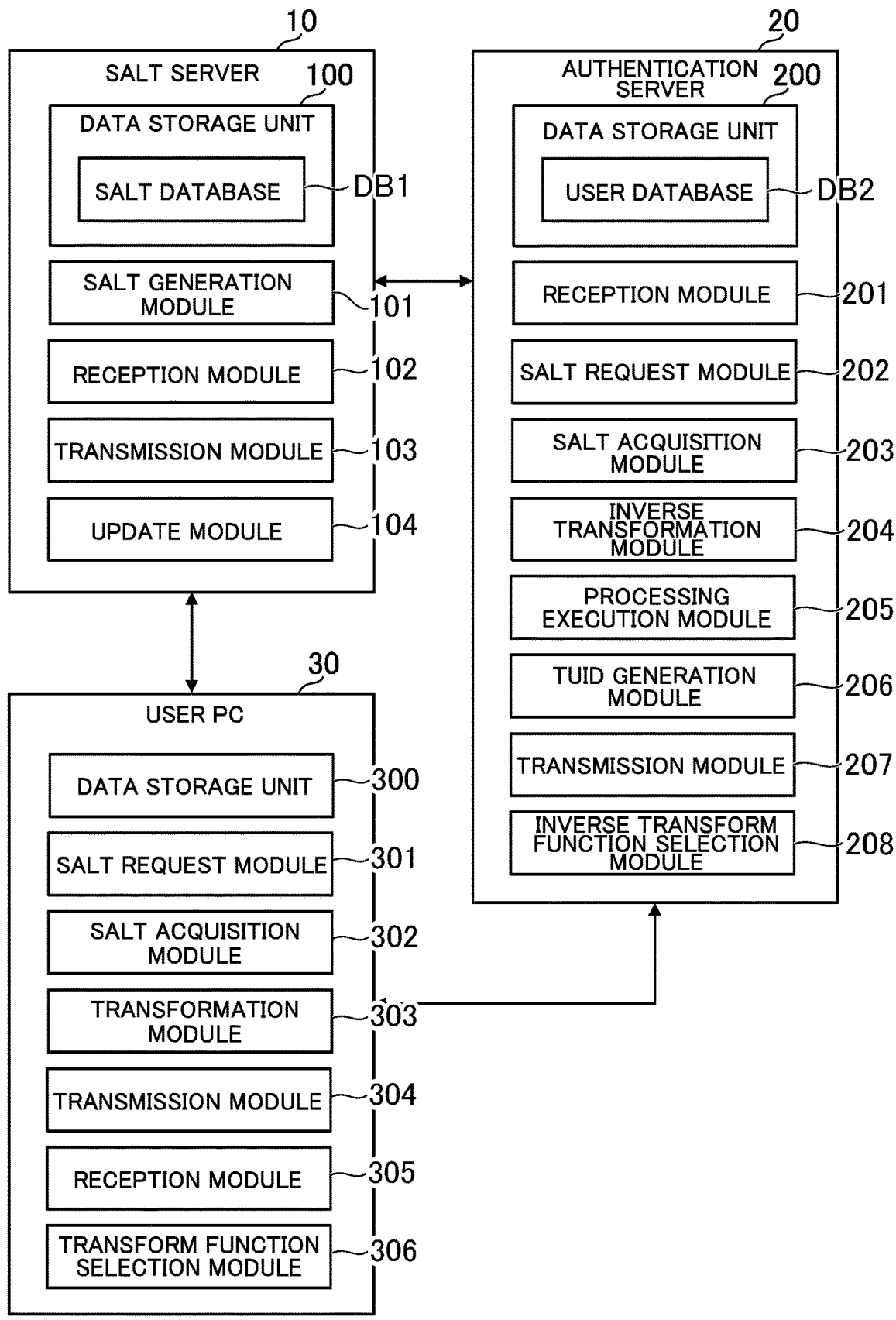
FIG. 10 is a diagram for an example of functional blocks implemented by a communication system according to the third embodiment.

FIG. 10 is a diagram for illustrating an example of functional blocks implemented by the communication system S according to the third embodiment. As illustrated in FIG. 10, in the third embodiment, an inverse transform function selection module 208 and a transform function selection module 306 are implemented. The inverse transform function selection module 208 is implemented mainly by the control unit 21. The transform function selection module 306 is implemented mainly by the control unit 31.

The transform function selection module 306 selects a first transformation method corresponding to the first period from among the plurality of transform functions "f". The transform function "f" is an example of a first transformation method. Accordingly, the transform function "f" as used herein can be read as "transformation method." The transformation method is a method of transforming the TUID. The transformation method is not limited to the transform function "f" as long as the transformation method defines how to transform the TUID. For example, the transformation method may be a calculation formula that is not called "function" or may be an encryption algorithm. In addition, for example, the transformation method may be a file compression algorithm.

The transform function selection module 306 is only required to select one of the plurality of transform functions "f" based on a predetermined selection method. In the third embodiment, a case of using the time slot as an example of the selection method is described. The transform function selection module 306 selects the transform function "f" corresponding to the time slot. It is assumed that a relationship between the time slot and the transform function "f" is defined in the data storage unit 300 in advance. The transform function selection module 306 selects the transform function "f" corresponding to the current time slot. In the third embodiment, the numerical values "00" to "23" indicated by the time slots correspond to the numerical values included in the transform functions "f0" to "f23", respectively.

In the third embodiment, the time slot is an example of the first period. Accordingly, the time slot as used herein can be read as "first period." In the third embodiment, a case in which the first period is represented by the time slot is described, but the first period may be represented by a combination of the day and time slot as in the first embodiment and the second embodiment, or may be represented only by a day. Even when the first period has another meaning, the transform function selection module 306 selects the transform function "f" corresponding to the time slot indicated by the first period. It is assumed that the relationship between each individual period and the transform function "f" is defined in the data storage unit 300 in advance.

The transformation module 303 performs the first transformation by transforming the TUID based on the transform function "f" selected by the transform function selection module 306. The third embodiment differs from the first embodiment and the second embodiment in that the transform function "f" selected by the transform function selection module 306 is used, but other points are the same.

The inverse transform function selection module 208 selects the inverse transform function $f^{-1}$ corresponding to the first period from among a plurality of inverse transform functions $f^{-1}$. The inverse transform function $f^{-1}$ is an example of a first inverse transformation method. Accordingly, the inverse transform function $f^{-1}$ as used herein can be read as "first inverse transformation method." The first inverse transformation method is a method of inversely transforming the transformed TUID. The inverse transformation method is not limited to the inverse transform function $f^{-1}$ as long as the inverse transformation method defines how to inversely transform the transformed TUID. For example, the inverse transformation method may be a calculation formula that is not called "function" or may be a decryption algorithm. In addition, for example, the inverse transformation method may be a file decompression algorithm.

The inverse transform function selection module 208 is only required to select one of the plurality of inverse transform functions $f^{-1}$ based on a predetermined selection method. In the third embodiment, a case of using the time slot as an example of the selection method is described. The inverse transform function selection module 208 selects the inverse transform function $f^{-1}$ corresponding to the time slot indicated by the first period. It is assumed that a relationship between the time slot and the inverse transform function $f^{-1}$ is defined in the data storage unit 200 in advance. The inverse transform function selection module 208 selects the inverse transform function $f^{-1}$ corresponding to the current time slot. For example, the inverse transform function selection module 208 selects the inverse transform function $f^{-1}$ corresponding to the first transformation period as the inverse transform function $f^{-1}$ corresponding to the transform function "f" selected by the transform function selection module 306.

The inverse transformation module 204 performs the first inverse transformation by inversely transforming the transformed TUID based on the inverse transform function $f^{-1}$ selected by the inverse transform function selection module 208. The third embodiment differs from the first embodiment and the second embodiment in that the inverse transform function $f^{-1}$ selected by the inverse transform function selection module 208 is used, but other points are the same.

According to the communication system S of the third embodiment, the user PC 30 selects the transform function "f" corresponding to the first period from among the plurality of transform functions "f" to transform a TUID. The authentication server 20 selects an inverse transform function $f^{-1}$ corresponding to the first period from among the plurality of inverse transform functions $f^{-1}$ to inversely transform the transformed TUID. Thus, the transformed TUID is transmitted over a network, and it becomes difficult for a third party to acquire the TUID, thereby enhancing security in communication. Further, the transform function "f" is dynamically changed, and hence it becomes difficult for a third party to grasp the mechanism for the transformation, thereby further enhancing security in communication.

Further, the user PC 30 selects the transform function "f" corresponding to the time slot indicated by the first period. The authentication server 20 selects the inverse transform function $f^{-1}$ corresponding to the time slot indicated by the first period. Thus, the transform function "f" is changed in accordance with a shorter period, thereby further lowering the frequency with which the same transform function "f" is repeatedly used, and it becomes difficult for a third party to grasp the mechanism for the transformation.

4. Modification Examples

Note that, the present disclosure is not limited to the first embodiment to the third embodiment, which have been described above, and can be modified suitably without departing from the spirit of the present disclosure.

4-1. Modification Example 1

For example, in the example of FIG. 2 for illustrating the first embodiment, it is assumed that a time point at which the salt request was received from the user PC 30 is "01:59:59 on Dec. 2, 2021" and a time point at which the salt request was received from the authentication server 20 is "02:00:00 on Dec. 2, 2021." In this case, the salt acquired by the user PC 30 is "8414" and a salt acquired by the authentication server is "9436". In this case, the salt used for the transformation of the TUID and the salt used for the inverse transformation of the transformed TUID differ from each other, and hence the authentication server 20 cannot acquire the correct TUID. In view of this, in Modification Example 1 of the present disclosure, a case in which information that can identify which time slot the salt used for the transformation of the TUID belongs to is transmitted from the user PC 30 to the authentication server 20 is described.

Figure 11:
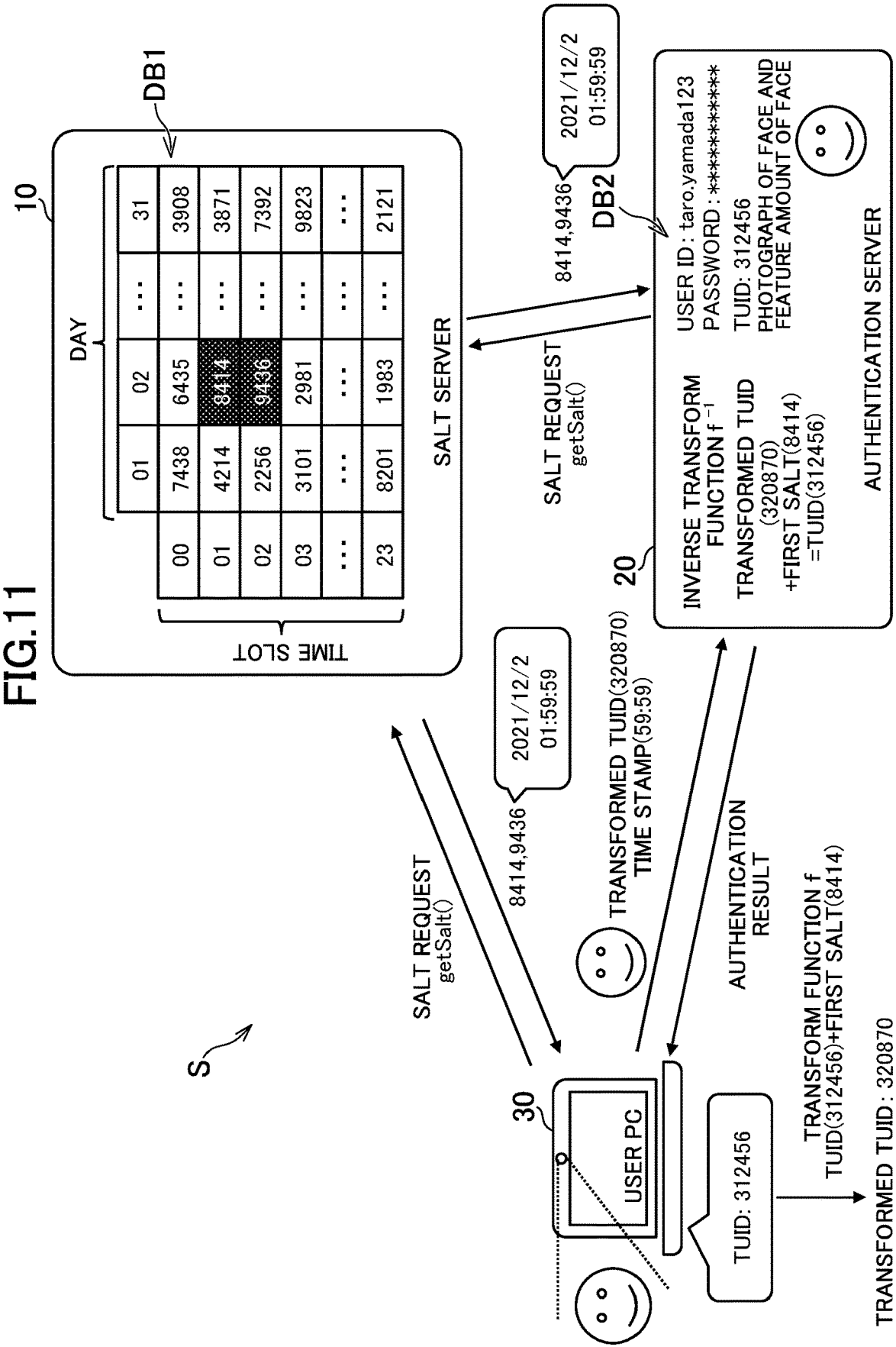
FIG. 11 is a diagram for illustrating an example of a flow of multi-factor authentication in Modification Example 1 of the present disclosure.

FIG. 11 is a diagram for illustrating an example of a flow of multi-factor authentication in Modification Example 1. In Modification Example 1, a flow to be performed until the salt server 10 receives a salt request from the user PC 30 is the same as in the first embodiment. When the salt server 10 receives a salt request from the user PC 30, the salt server 10 transmits, to the user PC 30, the first salt corresponding to the day and time slot to which the current time point belongs and the second salt corresponding to the subsequent time slot.

In the example of FIG. 11, it is assumed that the time point at which the salt request was received from the user PC 30 is "01:59:59 on Dec. 2, 2021." The salt server 10 transmits, to the user PC 30, a pair of the first salt "8414" corresponding to the day "02" and the hour "01" and the second salt "9436" corresponding to the day "02" and the hour "02" being the subsequent time slot. The user PC 30 receives the pair of salts "8414" and "9436" from the salt server 10.

The user PC 30 selects any one of the pair of salts "8414" and "9436". The user PC 30 may select the salt based on a predetermined selection method. In Modification Example 1, a case in which it is determined to select the first salt is taken as an example, but the salt may be selected based on another selection method. For example, the user PC 30 may select the salt based on a time point at which the salt request was transmitted, a time point at which the pair of salts was received, or a time point of selecting the salt.

In the example of FIG. 11, the user PC 30 transforms the TUID "312456" based on the first salt "8414". The transformed TUID is "320870". The user PC 30 transmits, to the authentication server 20, the transformed TUID "320870" and a time stamp "59:59" that can identify the time slot corresponding to the first salt "8414". This time stamp may be the current time point "01:59:59 on Dec. 2, 2021," but only "59:59" is to be transmitted in order to reduce information available to a third party. As the time stamp, any one of the time point at which the salt request was transmitted, the time point at which the pair of salts was received, a time point at which the TUID was transformed, or a time point at which the transformed TUID is transmitted may be used.

When the authentication server 20 receives the transformed TUID "320870" and the time stamp "59:59", the authentication server 20 transmits a salt request to the salt server 10. When the salt server 10 receives the salt request from the authentication server 20, the salt server 10 transmits, to the authentication server 20, a pair of the salt corresponding to the day and time slot to which the current time point belongs and the salt corresponding to the subsequent or previous time slot.

In the example of FIG. 11, it is assumed that the time point at which the salt request was received from the authentication server 20 is "01:59:59 on Dec. 2, 2021." In this case, the salt server 10 transmits, to the authentication server 20, a pair of the first salt "8414" corresponding to the day "02" and the hour "01" and the second salt "9436" corresponding to the day "02" and the hour "02" being the subsequent time slot. The authentication server 20 receives the pair of salts "8414" and "9436" from the salt server 10.

Meanwhile, it is assumed that the time point at which the salt request was received from the authentication server 20 is "02:00:00 on Dec. 2, 2021." In this case, the salt server transmits, to the authentication server 20, a pair of the first salt "8414" corresponding to the day "02" and the hour "01" being the previous time slot and the second salt "9436" corresponding to the day "02" and the hour "02" being the time slot to which the current time point belongs. The authentication server 20 receives the pair of salts "8414" and "9436" from the salt server 10. In this manner, the salt server 10 may control whether to transmit the salt for the previous time slot or to transmit the salt for the subsequent time slot depending on whether the time point is immediately before or after a time slot break.

The authentication server 20 can identify that the salt for the relatively earlier time slot has been used for the transformation based on the time stamp "59:59" received from the user PC 30. That is, it can be identified that, of the pair of salts received from the authentication server 20, the first salt has been used. The authentication server 20 executes inverse transformation on the transformed TUID "320870" based on the first salt "8414". The subsequent flow is the same as in the first embodiment.

Meanwhile, it is assumed that the time stamp received from the user PC 30 is "00:00". In this case, the user PC 30 uses the salt "9436" instead of the salt "8414" to transform the TUID "312456". In this case, the authentication server 20 can identify, based on this time stamp, that the salt for the relatively later time slot has been used for the transformation.

That is, the authentication server 20 executes inverse transformation based on the second salt "9436" In the example of FIG. 11, it is assumed that a time point at which the salt server 10 received the salt request from the user PC 30 is "23:59:59 on Dec. 1, 2021." It suffices that the salt server 10 transmits, to the user PC 30, a first salt "8201" corresponding to the day "01" and the hour "23" and the second salt "6435" corresponding to the subsequent day "02" and the hour "00".

The transmission module 304 further transmits first period information relating to the first period to the authentication server 20. In the example of FIG. 11, the hour "01" on the day "02" corresponds to the first period. The first period information is information that can identify the period the salt for which is to be used. In the example of FIG. 11, the time stamp "59:59" corresponds to the first period information. Accordingly, the time stamp "59:59" as used herein can be read as "first period information."

The reception module 201 further receives the first period information from the user PC 30. In the example of FIG. 11, the reception module 201 receives the time stamp "59:59" from the user PC 30 as the first period information. When the reception module 201 receives the first period information, the salt request module 202 requests a salt from the salt server 10. The salt request is as described in the first embodiment to the third embodiment.

When a time point at which the salt server 10 received the request from the authentication server 20 falls in the second period later than the first period, the salt server 10 transmits, to the authentication server 20, a plurality of salts including the salt corresponding to the first period and the salt corresponding to the second period. The combination of the day and time slot is an example of the second period. Accordingly, the combination of the day and time slot as used herein can be read as "second period."

In the example of FIG. 11, the first period is the hour "01" on the day "02". The end point of this first period is a time point (for example, "01:59:59" on the day "02") immediately before "02:00:00" on the day "02". In the example of FIG. 11, the first time point "01:59:59 on Dec. 2, 2021" is the same as or immediately before this end time point, and hence the salt server 10 transmits the salt "8414" for the hour "01" on the day "02", which is the first period, and the salt "9436" for the hour "02" on the day "02", which is the second period subsequent to the first period.

For example, when the time point is immediately after the first period, the salt server 10 transmits a plurality of salts including the salt corresponding to the first period and the salt corresponding to the third period previous to the first period. The phrase "immediately after" refers to within a predetermined time period (for example, within several seconds to one minute) from a start time point of the first period. For example, in the example of FIG. 11, it is assumed that the first time point is "02:00:00 on Dec. 2, 2021" instead of "01:59:59 on Dec. 2, 2021." In this case, the first period is the hour "02" on the day "02". The start time point of this first period is "02:00:00" on the day "02". The first time point "02:00:00 on Dec. 2, 2021" is the same as or immediately after this start time point, and hence the salt server 10 transmits the salt "8414" for the hour "01" on the day "02", which is the third period previous to the first period, and the salt "9436" for the hour "02" on the day "02", which is the first period.

The salt acquisition module 203 acquires the salt corresponding to the first period based on the first period information. The salt acquisition module 203 acquires the salt corresponding to the first period from among the plurality of salts received from the salt server 10 based on the first period information. In the example of FIG. 11, the salt acquisition module 203 selects any one of the pair of salts received from the salt server 10 based on the first period information. In the example of FIG. 11, the salt acquisition module 203 can identify based on the time stamp "59:59" that the salt for the earlier time is to be selected. Thus, the salt acquisition module 203 selects the first salt "8414". Processing for the inverse transformation performed after the salt "8414" is selected is the same as in the first embodiment to the third embodiment.

Meanwhile, in the example of FIG. 11, it is assumed that the time stamp is "00:00" instead of "59:59". In this case, the salt acquisition module 203 can identify based on the time stamp "00:00" that the salt for the later time is to be selected. Thus, the salt acquisition module 203 selects the second salt "9436". Processing for the inverse transformation performed after the salt "9436" is selected is the same as in the first embodiment to the third embodiment.

According to the communication system S of the Modification Example 1, the user PC 30 further transmits a time stamp, which is an example of the first period information, to the authentication server 20. The authentication server 20 acquires the first salt based on the time stamp received from the user PC 30. Thus, inverse transformation can be executed accurately even when the first salt is acquired immediately before the end of a certain time slot. This can save time and effort to perform a retry after failing in the multi-factor authentication, thereby enhancing the convenience of the user. The salt server 10, the authentication server 20, and the user PC 30 do not execute unrequired processing as well, and hence processing loads thereon can be reduced.

Further, when the time point at which the salt server 10 received the salt request from the authentication server 20 falls in the second period later than the first period, the salt server transmits, to the authentication server 20, a plurality of salts including the salt corresponding to the first period and the salt corresponding to the second period. The authentication server 20 selects a first salt to be used for inverse transformation from among the plurality of salts based on the time stamp, which is an example of the first period information. Accordingly, the inverse transformation can be executed with accuracy, to thereby be able to save time and effort to perform a retry after failing in the multi-factor authentication.

4-2. Modification Example 2

For example, even when the transform function "f" and the inverse transform function $f^{-1}$ are selected as in the third embodiment (FIG. 9), there is a possibility that the same problem as in Modification Example 1 may occur. For example, it is assumed that the time point at which the user PC 30 performs transformation is "01:59:59 on Dec. 2, 2021" and the time point at which the authentication server 20 performs inverse transformation is "02:00:00 on Dec. 2, 2021." In this case, the transform function "f" for the TUID do not correspond to the inverse transform function $f^{-1}$ for the transformed TUID, and hence there is a possibility that the authentication server 20 cannot acquire the correct TUID.

In view of this, in Modification Example 2 of the present disclosure, it is assumed that, in the same manner as in Modification Example 1, the user PC 30 transmits the time stamp "59:59" to the authentication server 20. The authentication server 20 can identify, based on this time stamp, that, even when the time point at which the inverse transformation is performed is "02:00:00 on Dec. 2, 2021," it is only required to use the inverse transform function $f^{-1}$ corresponding to the previous time slot. The transmission module 304 further transmits the first period information to the authentication server 20.

Assuming that the timing at which the salt request is transmitted from the user PC 30 to the salt server 10 is such a timing as shown in FIG. 11, the hour "01" on the day "02" corresponds to the first period. The first period information in Modification Example 2 is information that can identify the period the inverse transform function $f^{-1}$ for which is to be used. In the above-mentioned example, the time stamp "59:59" corresponds to the first period information. Accordingly, the time stamp "59:59" as used herein can be read as "first period information." The reception module 201 further receives the first period information from the user PC 30.

The inverse transform function selection module 208 selects the inverse transform function $f^{-1}$ corresponding to the first transformation period based on the first period information. Modification Example 2 is different from the third embodiment in that the inverse transform function $f^{-1}$ is selected based on the first period information instead of the time point of selecting the inverse transform function $f^{-1}$, but other points are the same as in the third embodiment. It suffices that the inverse transform function selection module 208 selects the inverse transform function $f^{-1}$ corresponding to the first transformation period from among the plurality of inverse transform functions $f^{-1}$ based on the first period information.

According to the communication system S of Modification Example 2, the user PC 30 transmits the first period information relating to the first transformation period to the authentication server 20. The authentication server 20 selects, based on the first period information received from the user PC 30, the inverse transform function $f^{-1}$ corresponding to the first transformation period. This enhances security in multi-factor authentication. Even when the transformation of the TUID is executed immediately before the end of a certain time slot, the multi-factor authentication can be executed with accuracy. This can save time and effort to perform a retry after failing in the multi-factor authentication, thereby enhancing the convenience of the user. The salt server 10, the authentication server 20, and the user PC 30 do not execute unrequired processing as well, and hence processing loads thereon can be reduced.

4-3. Modification Example 3

For example, it is assumed that, before the login of the user, a malicious third party has performed a cross-site scripting attack or the like to steal, from within the user PC 30, the TUID, the transform function "f", the method of accessing the salt server 10 (for example, flow of acquiring a salt by transmitting a getSalt( ) command to a specific IP address), and the photograph of the face of the user. In this case, even when the TUID is updated each time the user logs in, the third party has obtained a series of steps for accessing the salt server 10 and the information required for authentication, and hence there is a fear in that impersonation may become possible.

In view of this, when the user registers information such as the photograph of the face in the authentication server 20 or logs in through use of a user ID, a password, and the like in a secure manner, the user PC 30 may generate a hash value which is based on a plurality of pieces of information relating to the own device and transmit the hash value to the authentication server 20. This hash value is associated with the user ID and stored in the user database DB2. When the user executes authentication using the TUID to log in, the transmission module 304 of the user PC 30 transmits, to the authentication server 20, the transformed TUID and the hash value which is based on the plurality of pieces of information relating to the user PC 30. As described in the first embodiment and the like, the transmission module 304 transmits the photograph of the face of the user as well.

The processing execution module 205 of the authentication server 20 executes the authentication processing based on the TUID acquired by the first inverse transformation and the hash value. In the communication system S described in the first embodiment and the like, not only TUID authentication but also face authentication is used in combination, and hence the processing execution module 205 executes the authentication processing based on the TUID, the feature amount of the face, and the hash value. Thus, the authentication processing in Modification Example 3 is three-factor authentication. The authentication using the TUID and the feature amount of the face is as described in the first embodiment and the like. The processing execution module 205 determines whether or not the hash value received from the user PC 30 and the hash value stored in the user database DB2 in association with the user ID of the user match each other. When those match each other, the authentication using the hash value is successful.

Any pieces of information can be combined as the plurality of pieces of information for generating a hash value. For example, the user PC 30 may generate a hash value based on a plurality of pieces of information such as the type of the user PC 30, the type of an operating system, and the type of a browser. In addition, for example, the hash value may be generated based on other information such as a serial number of the user PC 30, a number of a SIM card, or a MAC address of a network card. Various hash functions can be used as the hash function itself for generating a hash value. It is assumed that the hash value is generated for each authentication instead of being stored in the user PC 30.

According to the communication system S of Modification Example 3, security is enhanced by authentication using a hash value. For example, even when a malicious third party fraudulently obtains the TUID and the like from within the user PC 30, it is highly possible that the hash value cannot be identified, and hence security is enhanced.

4-4. Modification Example 4

For example, the communication system S can be applied to another situation different from the situation in which the authentication processing is executed. As another situation, the communication system S can also be applied to another screen such as a situation in which an electronic mail is sent, a situation in which a file is uploaded or downloaded, a situation in which a post is made on social media, a situation in which a certain page is displayed on a browser, or a situation in which personal information is uploaded or downloaded by the user.

For example, when the communication system S is applied to the situation in which an electronic mail is sent, the first device is a computer on an electronic mail sending side, and the second device is a computer on an electronic mail receiving side. The original data is electronic mail data. The original data includes body text of an electronic mail. When an attached file is attached to the electronic mail, the original data includes the attached file. The first device subjects the original data, which is the electronic mail, to the first transformation based on the first salt corresponding to the first period to generate the first transformed data. The first transformed data is the transformed electronic mail. The first device transmits the first transformed data, which is the transformed electronic mail, to the second device. When the second device receives the first transformed data, the second device performs the first inverse transformation based on the first salt to acquire the electronic mail, which is the original data. A method of acquiring the first salt is as described in the first embodiment to the third embodiment and Modification Example 1 to Modification Example 3.

For example, when the communication system S is applied to the situation in which a file is uploaded or downloaded, the first device is a computer of the user that uploads the file, and the second device is a server that receives the file. The original data is a file to be uploaded. The first device subjects the original data, which is the file to be uploaded, to the first transformation based on the first salt corresponding to the first period to generate the first transformed data. The first transformed data is the transformed file. The first device transmits the first transformed data, which is the transformed file, to the second device. When the second device receives the first transformed data, the second device performs the first inverse transformation based on the first salt to acquire the file, which is the original data. A method of acquiring the salt is as described in the first embodiment to the third embodiment and Modification Example 1 to Modification Example 3.

The same applies to a case of applying the communication system S to another situation, and the first device is only required to subject the original data to the first transformation corresponding to the first period. The second device is only required to subject the first transformed data to the first inverse transformation corresponding to the first period.

According to the communication system S of Modification Example 4, security in communication is enhanced in various situations.

4-5. Other Modification Examples

For example, the first embodiment to the third embodiment may be combined. The above-mentioned modification examples may be combined.

For example, the processing in Modification Example 1 or Modification Example 2 may be executed only immediately before the end of a certain time slot. For example, the functions described as being implemented by the salt server 10 may be implemented by the authentication server 20 or the user PC 30.

In this case, the communication system S is not required to include the salt server 10. For example, when the communication system S includes a plurality of server computers, the functions may be shared among the plurality of server computers. Further, for example, the data described as being stored in the data storage units 100 and 200 may be stored by a computer other than the salt server 10 or the authentication server 20.

The invention claimed is:
1. A communication system, comprising:
a first device; and
a second device,
wherein the first device is configured to:
generate first transformed data by subjecting original data to first transformation corresponding to a first period to which a first time point at which the original data is transformed belongs; and
transmit the first transformed data to the second device, and
wherein the second device is configured to:
receive the first transformed data from the first device; and acquire the original data by subjecting the first transformed data to first inverse transformation corresponding to the first period;
wherein the first device is configured to:
acquire first transformation information corresponding to the first period, which is transformation information for transforming the original data, and
perform the first transformation by transforming the original data based on the first transformation information,
wherein the second device is configured to:
acquire first inverse transformation information corresponding to the first period, which is inverse transformation information for inversely transforming the first transformed data,
perform the first inverse transformation by inversely transforming the first transformed data based on the first inverse transformation information;
wherein the first period is represented by a combination of a day and time slot,
wherein the first device is configured to acquire the first transformation information corresponding to the combination of a day and time slot indicated by the first period, and
wherein the second device is configured to acquire the first inverse transformation information corresponding to the combination of a day and time slot indicated by the first period.

2. The communication system according to claim 1, wherein the first device is configured to:
generate the first transformed data by subjecting the original data to the first transformation when the original data is transformed at a second time point belonging to the first period and being different from the first time point, and
generate second transformed data by subjecting the original data to second transformation corresponding to a second period different from the first period when the original data is transformed at a third time point belonging to the second period and being different from the first time point and the second time point,
wherein the second device is configured to:
acquire the original data by subjecting the first transformed data to the first inverse transformation, and
acquire the original data by subjecting the second transformed data to second inverse transformation corresponding to the second period.

3. The communication system according to claim 1,
wherein the original data comprises authentication data relating to a user of the first device,
wherein the first device is configured to generate the first transformed data by subjecting the authentication data to the first transformation,
wherein the second device is configured to:
acquire the authentication data by subjecting the first transformed data to the first inverse transformation,
execute, based on the authentication data acquired by the first inverse transformation, authentication processing relating to the user; and
generate a new piece of the authentication data when the authentication processing is successful.

4. The communication system according to claim 1,
wherein the original data comprises authentication data relating to a user of the first device,
wherein the first device is configured to:
generate the first transformed data by subjecting the authentication data to the first transformation, and
transmit the first transformed data and a hash value which is based on a plurality of pieces of information relating to the first device,
wherein the second device is configured to:
acquire the authentication data by subjecting the first transformed data to the first inverse transformation, and
execute authentication processing relating to the user based on the authentication data acquired by the first inverse transformation and the hash value.

5. A communication system, comprising:
a first device; and
a second device,
wherein the first device is configured to:
generate first transformed data by subjecting original data to first transformation corresponding to a first period to which a first time point at which the original data is transformed belongs; and
transmit the first transformed data to the second device, and
wherein the second device is configured to:
receive the first transformed data from the first device; and
acquire the original data by subjecting the first transformed data to first inverse transformation corresponding to the first period;
wherein the first device is configured to:
acquire first transformation information corresponding to the first period, which is transformation information for transforming the original data, and
perform the first transformation by transforming the original data based on the first transformation information,
wherein the second device is configured to:
acquire first inverse transformation information corresponding to the first period, which is inverse transformation information for inversely transforming the first transformed data, and
perform the first inverse transformation by inversely transforming the first transformed data based on the first inverse transformation information
wherein the first device is configured to further transmit first period information relating to the first period to the second device,
wherein the second device is configured to:
receive the first period information from the first device, and
acquire the first inverse transformation information based on the first period information.

6. The communication system according to claim 5, further comprising a third device configured to manage each of a plurality of periods and the inverse transformation information in association with each other,
wherein the second device is configured to request the third device for the inverse transformation information,
wherein the third device is configured to transmit, to the second device, the inverse transformation information corresponding to a period to which a time point at which a request is received from the second device belongs,
wherein the third device is configured to transmit a plurality of pieces of the inverse transformation information to the second device when the time point at which a request is received from the second device is a second period later than the first period, the plurality of pieces of the inverse transformation information including the first inverse transformation information corresponding to the first period and second inverse transformation information corresponding to the second period, and
wherein the second device is configured to select, based on the first period information, the first inverse transformation information from among the plurality of pieces of the inverse transformation information.

7. A communication system, comprising:
a first device; and
a second device,
wherein the first device is configured to:
    generate first transformed data by subjecting original data to first transformation corresponding to a first period to which a first time point at which the original data is transformed belongs; and
    transmit the first transformed data to the second device, and
wherein the second device is configured to:
    receive the first transformed data from the first device; and
    acquire the original data by subjecting the first transformed data to first inverse transformation corresponding to the first period;
wherein the first device is configured to:
    acquire first transformation information corresponding to the first period, which is transformation information for transforming the original data, and
    perform the first transformation by transforming the original data based on the first transformation information,
wherein the second device is configured to:
    acquire first inverse transformation information corresponding to the first period, which is inverse transformation information for inversely transforming the first transformed data, and
    perform the first inverse transformation by inversely transforming the first transformed data based on the first inverse transformation information;
wherein the first device is configured to acquire the first transformation information corresponding to the first period and a part of the original data,
wherein the first transformation comprises transformation corresponding to the first period and the part,
wherein the first device is configured to further transmit an untransformed part, which is the part that has not been transformed, to the second device,
wherein the second device is configured to acquire the inverse transformation information corresponding to the first period and the untransformed part, and
wherein the first inverse transformation comprises inverse transformation corresponding to the first period and the untransformed part.

8. The communication system according to claim 7,
wherein the first device is configured to generate the first transformed data by transforming, based on the first transformation information, a remaining part of the original data other than the part, and
wherein the second device is configured to acquire the remaining part by inversely transforming the first transformed data based on the inverse transformation information, and acquire the original data based on the remaining part and the untransformed part.

9. A communication system, comprising:
a first device; and
a second device,
wherein the first device is configured to:
    generate first transformed data by subjecting original data to first transformation corresponding to a first period to which a first time point at which the original data is transformed belongs; and
    transmit the first transformed data to the second device, and
wherein the second device is configured to:
    receive the first transformed data from the first device; and
    acquire the original data by subjecting the first transformed data to first inverse transformation corresponding to the first period;
wherein the first device is configured to:
    acquire first transformation information corresponding to the first period, which is transformation information for transforming the original data, and
    perform the first transformation by transforming the original data based on the first transformation information,
wherein the second device is configured to:
    acquire first inverse transformation information corresponding to the first period, which is inverse transformation information for inversely transforming the first transformed data, and
    perform the first inverse transformation by inversely transforming the first transformed data based on the first inverse transformation information;
further comprising a data storage configured to store a database in which each of a plurality of periods, the transformation information, and the inverse transformation information are associated with one another,
    wherein the first device is configured to acquire the first transformation information associated with the first period in the database, and
    wherein the second device is configured to acquire the first inverse transformation information associated with the first period in the database.

10. The communication system according to claim 9, further comprising a third device configured to update the database.

11. A communication system, comprising:
a first device; and
a second device,
wherein the first device is configured to:
    generate first transformed data by subjecting original data to first transformation corresponding to a first period to which a first time point at which the original data is transformed belongs; and
    transmit the first transformed data to the second device, and
wherein the second device is configured to:
    receive the first transformed data from the first device; and
    acquire the original data by subjecting the first transformed data to first inverse transformation corresponding to the first period;
wherein the first device is configured to:
    acquire first transformation information corresponding to the first period, which is transformation information for transforming the original data, and
    perform the first transformation by transforming the original data based on the first transformation information,
wherein the second device is configured to:
    acquire first inverse transformation information corresponding to the first period, which is inverse transformation information for inversely transforming the first transformed data, and perform the first inverse transformation by inversely transforming the first transformed data based on the first inverse transformation information;

further comprising a third device configured to manage each of a plurality of periods, the transformation information, and the inverse transformation information in association with one another, wherein the first device is configured to request the third device for the transformation information, wherein the first time point comprises a time point at which the third device receives a request from the first device, wherein the third device is configured to transmit the first transformation information to the first device, wherein the first device is configured to acquire the first transformation information from the third device, wherein the second device is configured to request the third device for the inverse transformation information, wherein the third device is configured to transmit the first inverse transformation information to the second device when a request is received from the second device in the first period, and wherein the second device is configured to acquire the first inverse transformation information from the third device.

12. The communication system according to claim 11, wherein the first device is configured to transmit, to the third device, a request that excludes information relating to an acquisition rule for the transformation information, and wherein the second device is configured to transmit, to the third device, a request that excludes information relating to an acquisition rule for the inverse transformation information.

13. A communication system, comprising:

a first device; and a second device, wherein the first device is configured to:

generate first transformed data by subjecting original data to first transformation corresponding to a first period to which a first time point at which the original data is transformed belongs; and transmit the first transformed data to the second device, and wherein the second device is configured to:

receive the first transformed data from the first device; and acquire the original data by subjecting the first transformed data to first inverse transformation corresponding to the first period;

wherein the first device is configured to select a first transformation method corresponding to the first period from among a plurality of transformation methods, wherein the first device is configured to perform the first transformation by transforming the original data based on the first transformation method, wherein the second device is configured to select a first inverse transformation method corresponding to the first period from among a plurality of inverse transformation methods, and wherein the second device is configured to perform the first inverse transformation by inversely transforming the original data based on the first inverse transformation method;

wherein the first period is represented by a time slot, wherein the first device is configured to select the first transformation method corresponding to the time slot indicated by the first period, and wherein the second device is configured to select the first inverse transformation method corresponding to the time slot indicated by the first period.

14. A communication system, comprising:

a first device; and a second device, wherein the first device is configured to:

generate first transformed data by subjecting original data to first transformation corresponding to a first period to which a first time point at which the original data is transformed belongs; and transmit the first transformed data to the second device, and wherein the second device is configured to:

receive the first transformed data from the first device; and acquire the original data by subjecting the first transformed data to first inverse transformation corresponding to the first period;

wherein the first device is configured to select a first transformation method corresponding to the first period from among a plurality of transformation methods, wherein the first device is configured to perform the first transformation by transforming the original data based on the first transformation method, wherein the second device is configured to select a first inverse transformation method corresponding to the first period from among a plurality of inverse transformation methods, and wherein the second device is configured to perform the first inverse transformation by inversely transforming the original data based on the first inverse transformation method;

wherein the first device is configured to further transmit first period information relating to the first period to the second device, wherein the second device is configured to further receive the first period information from the first device, and wherein the first device is configured to select one of the plurality of inverse transformation methods corresponding to the first period based on the first period information.

* * * * *